May 12, 1953          A. L. LEE          2,638,332

FEEDING DRIVE MECHANISM FOR MINING MACHINES

Original Filed April 6, 1945          10 Sheets-Sheet 1

Inventor;
ARTHUR L. LEE,

By [signature]

Attorney.

May 12, 1953  A. L. LEE  2,638,332
FEEDING DRIVE MECHANISM FOR MINING MACHINES
Original Filed April 6, 1945  10 Sheets-Sheet 4
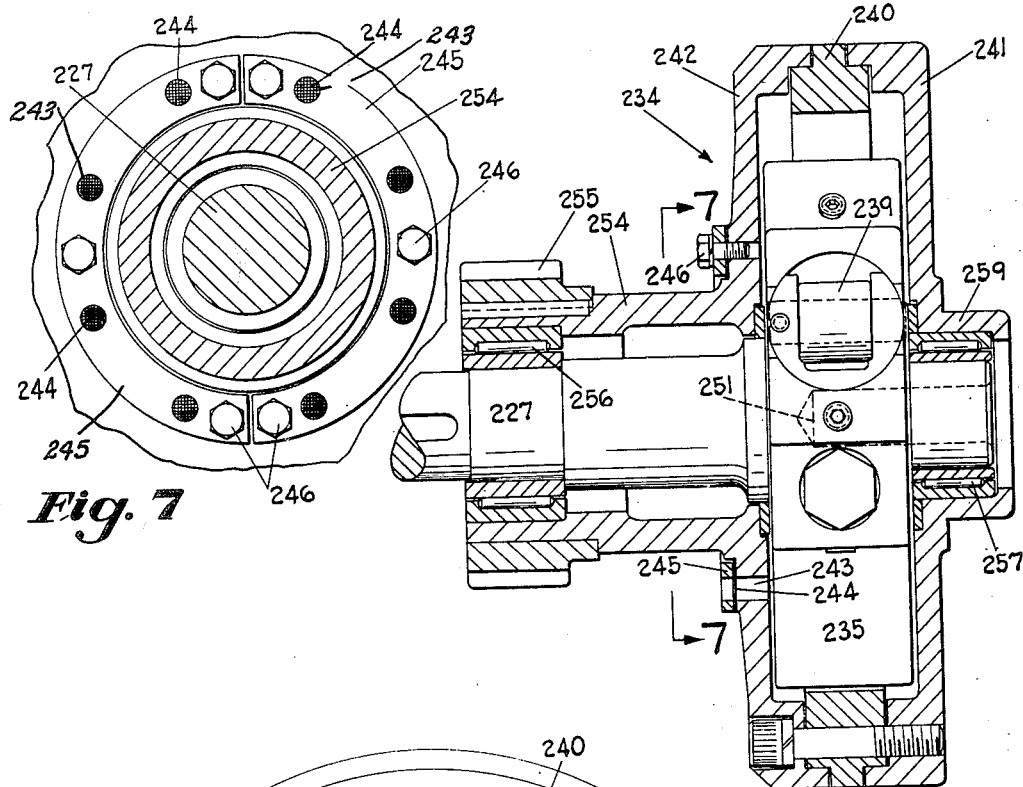
Fig. 7
Fig. 6
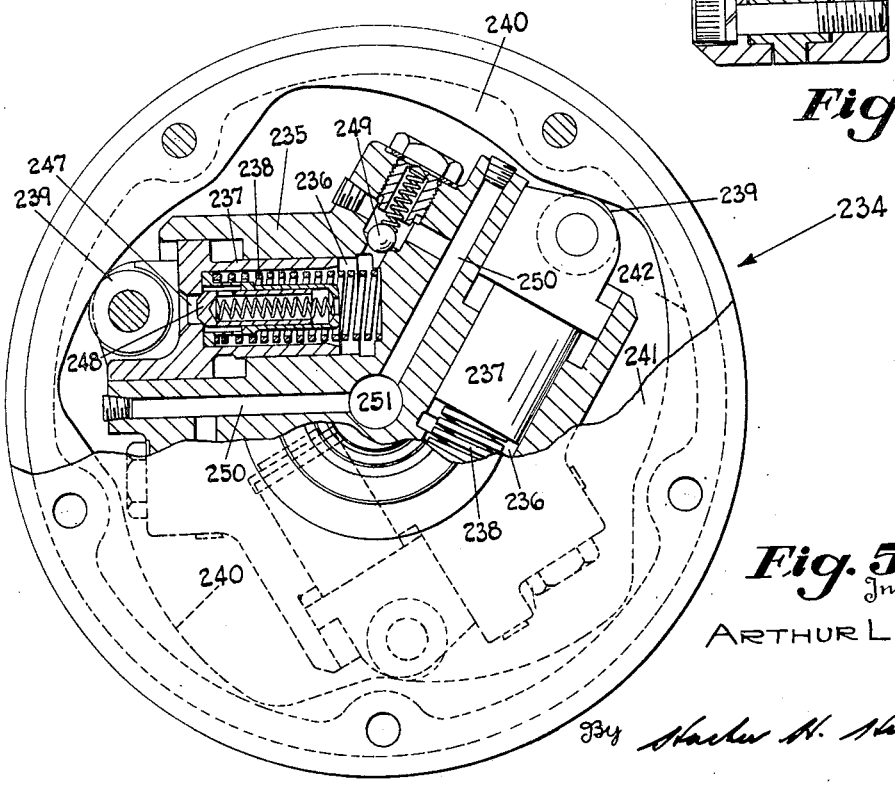
Fig. 5
Inventor:
ARTHUR L. LEE,
By Charles H. Stetson
Attorney.

May 12, 1953  A. L. LEE  2,638,332
FEEDING DRIVE MECHANISM FOR MINING MACHINES
Original Filed April 6, 1945  10 Sheets-Sheet 6
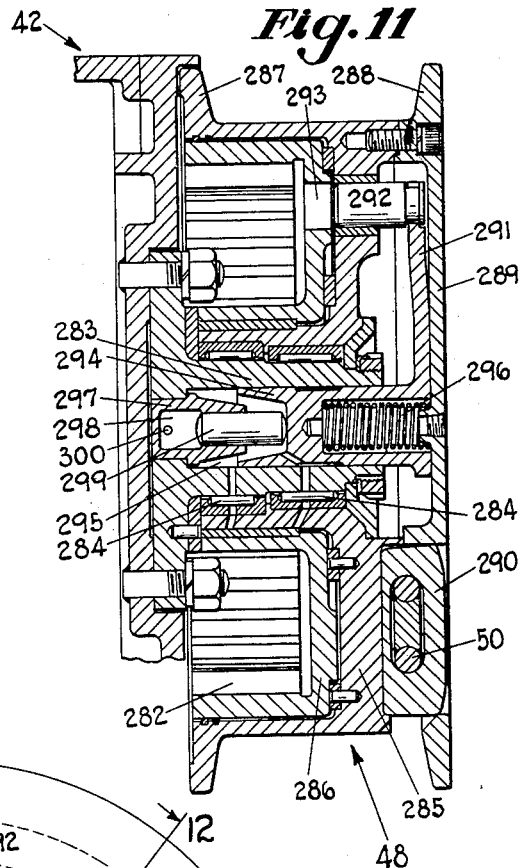
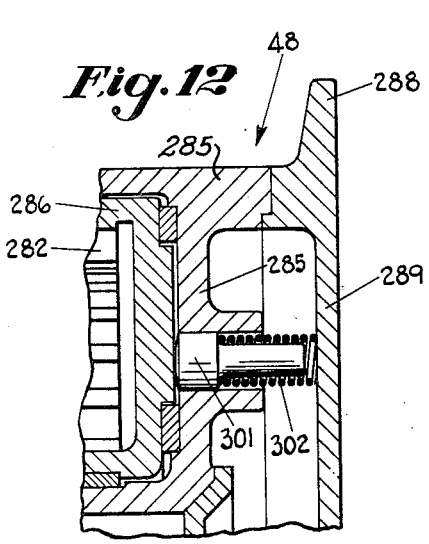
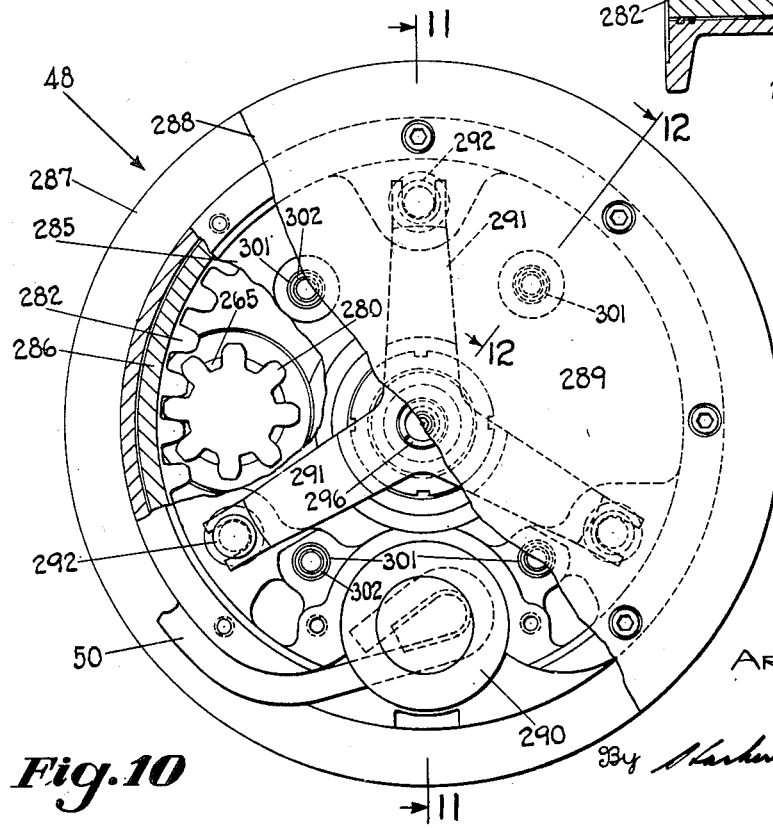
Inventor:
ARTHUR L. LEE,
By
Attorney.

May 12, 1953 A. L. LEE 2,638,332
FEEDING DRIVE MECHANISM FOR MINING MACHINES
Original Filed April 6, 1945 10 Sheets-Sheet 7

Inventor;
ARTHUR L. LEE,
By
Attorney.

May 12, 1953 A. L. LEE 2,638,332
FEEDING DRIVE MECHANISM FOR MINING MACHINES
Original Filed April 6, 1945 10 Sheets-Sheet 8

Inventor;
ARTHUR L. LEE,
By
Attorney.

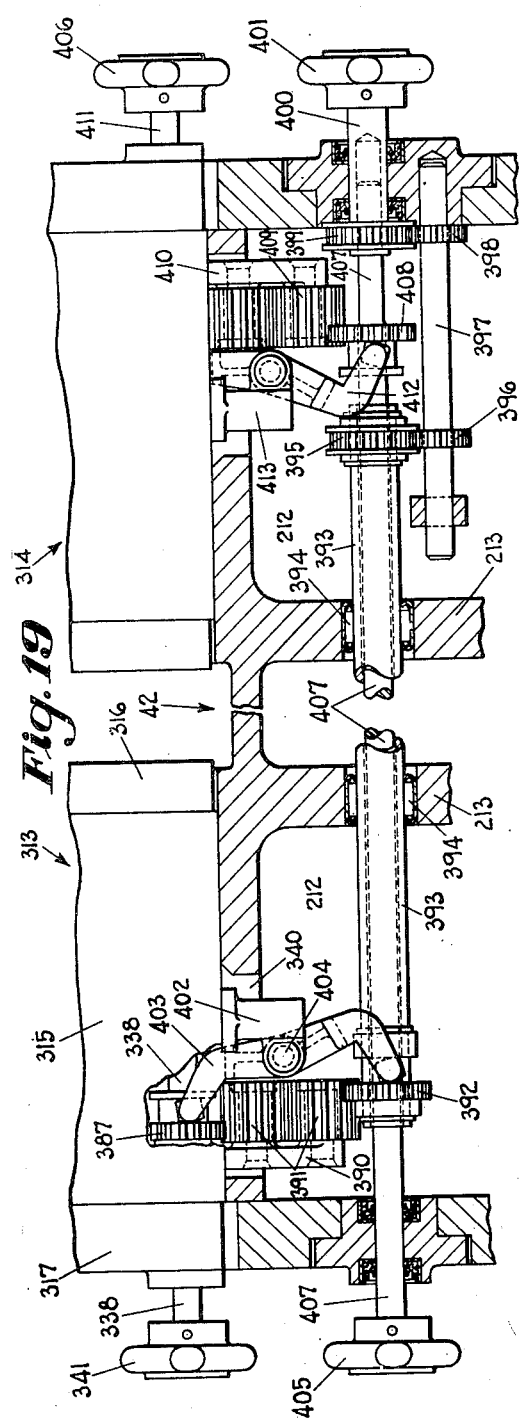
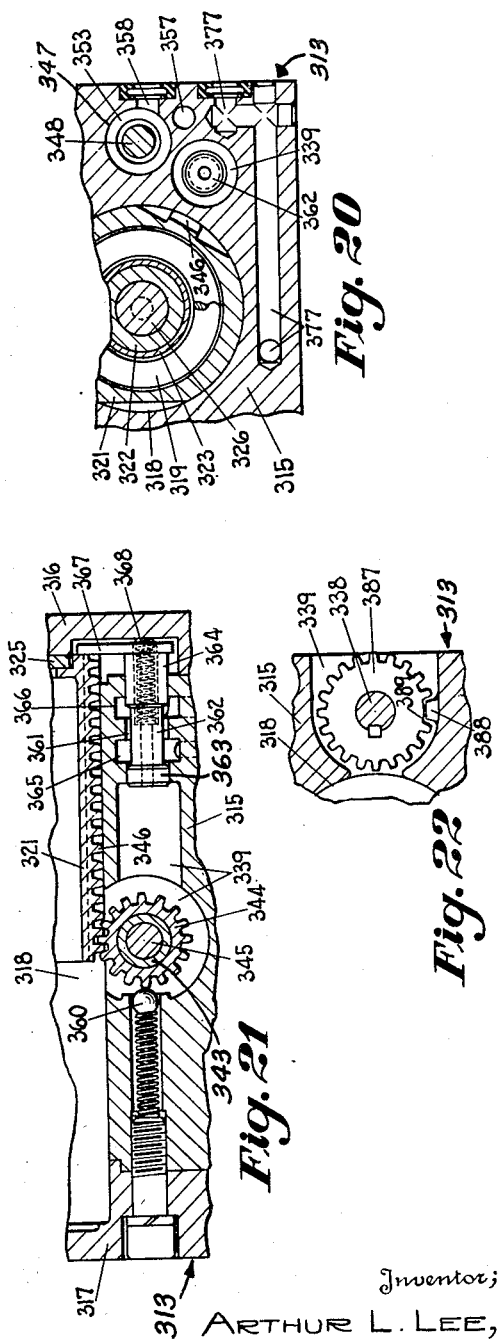

May 12, 1953 — A. L. LEE — 2,638,332
FEEDING DRIVE MECHANISM FOR MINING MACHINES
Original Filed April 6, 1945 — 10 Sheets-Sheet 10

Inventor:
ARTHUR L. LEE,
By
Attorney.

Patented May 12, 1953

2,638,332

UNITED STATES PATENT OFFICE 2,638,332

FEEDING DRIVE MECHANISM FOR MINING MACHINES

Arthur L. Lee, Upper Arlington, Ohio, assignor to The Jeffrey Manufacturing Company, a corporation of Ohio Original application April 6, 1945, Serial No. 586,979. Divided and this application June 12, 1946, Serial No. 676,200

8 Claims. (Cl. 262—30)

This invention relates to a mining machine and in the specific embodiment thereof disclosed in detail and in its most specific aspect it relates to a mining machine of the shortwall type, but it may be employed in other machines, such for example as longwall, longwall-shortwall, or arcwall mining machines.

One object of the invention is to provide improved gearing and control means in a mining machine.

Another object of the invention is to provide a mining machine having an improved feeding drive gearing including a hydraulic fluid coupling through which driving forces are transmitted to a feeding drum and a hydraulically operated clutch by which the feeding drum may be connected with and disconnected from the drive gearing and in which a variable relief valve for controlling the hydraulic fluid coupling and a control valve for the hydraulic clutch are interlocked to cause proper cooperation of said hydraulic coupling and said hydraulic clutch.

In carrying out the foregoing object it is a further object of the invention to provide an improved means for interlocking the variable relief valve for the hydraulic fluid coupling and the valve for the clutch which interlocking means is an operating means for the valves and may be operated from either side of the mining machine.

A further object of the invention is to provide a mining machine having a reversible motor and spaced feed drums including mechanism to provide for driving the drums always in the same direction, regardless of the direction of rotation of the motor.

Another and more specific object of the invention is to provide a mining machine having improved feeding device drive means which drive means may be the feeding drums of the mining machine, the drive means including a large gear adapted to be driven in reverse directions by the driving motor of the machine and reversible drive means driven from the large gear including clutches adapted selectively to drive the feeding means always in the same direction.

Still another object of the invention is to provide in the improved drive gearing set forth in the preceding object a gear that meshes with the large gear and from which a drive mechanism different from the feeding drive means mentioned may be driven.

A further object of the invention is to provide simple control mechanism for both a two-speed feed control mechanism and a fluid coupling mechanism on a mining machine, one being preferably controlled by rectilinear or reciprocatory motion, the other by rotary motion of the common control shaft, and in the more specific embodiment of the invention the control to be duplicated on opposite sides of the vehicle and also preferably providing for similar operation to produce similar results.

Other objects of the invention will appear hereinafter, the novel features and combinations being set forth in the appended claims.

In the accompanying drawings,

Fig. 5 is an end elevational view of the hydraulic fluid coupling, with one cover plate broken away and a portion of the rotor shown in section;

Fig. 6 is a sectional view through the casing or housing of the fluid coupling, the rotor being shown in elevation;

Fig. 7 is a sectional view taken on the line 7—7 of Fig. 6, looking in the direction of the arrows;

Fig. 10 is an end view of one of the rope or feed drums, with parts broken away and shown in section;

Fig. 11 is a sectional elevational view taken on the line 11—11 of Fig. 10, looking in the direction of the arrows;

Fig. 12 is a sectional view taken on the line 12—12 of Fig. 10, looking in the direction of the arrows;

Fig. 19 is a plan view, with parts broken away, showing particularly the control mechanism for the left hand and right hand combination valve assemblies, and showing the dual control mechanism for both valves;

Fig. 20 is a sectional view taken on the line 20—20 of Fig. 15, looking in the direction of the arrows;

Fig. 21 is a sectional view taken on the line 21—21 of Fig. 14 of the drawings;

Fig. 22 is a sectional view taken on the line 22—22 of Fig. 15 of the drawings;

This application is a division of my application Serial No. 586,979, filed April 6, 1945, for a Mining Machine.

Figure 1:
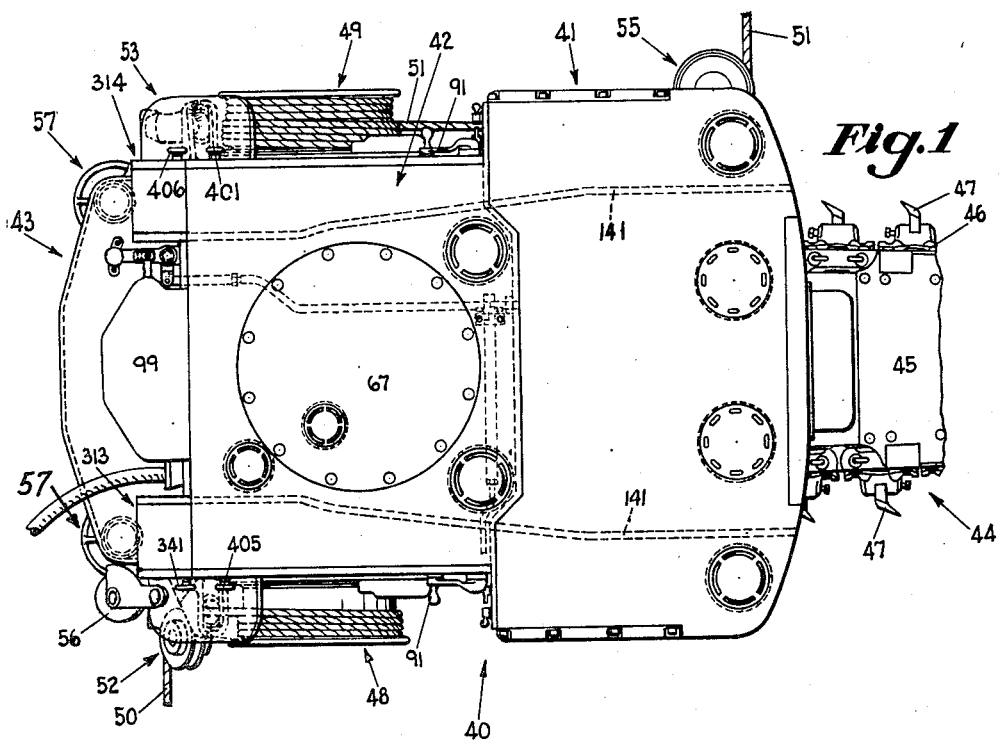
Fig. 1 is a plan view of a shortwall type machine which incorporates the features of my invention, the cutter bar being shown cut short.
Figure 2:
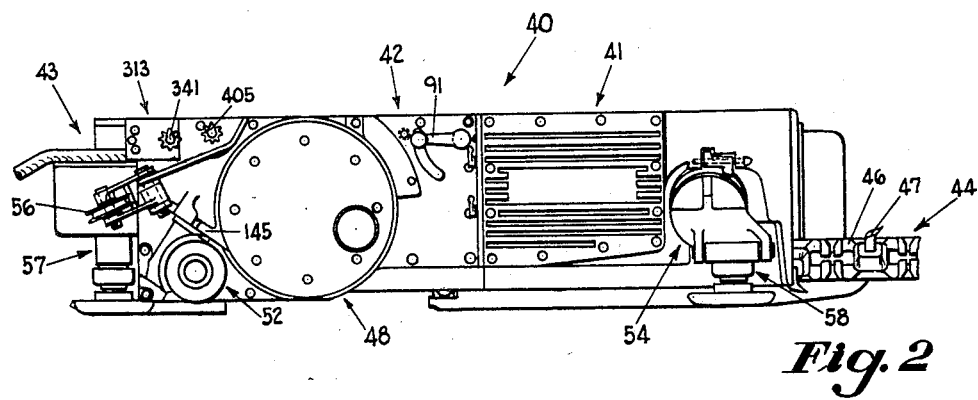
Fig. 2 is a side elevational view of the machine of Fig. 1.

Referring first to Figs. 1 and 2 of the drawings, the mining machine includes a main frame 40 which in practice is preferably formed of two substantially independent frames including a forward motor frame or section 41 and a rearward machinery frame or section 42, the two frames or sections 41 and 42 being removably connected together as by machine screws or bolts. Removably attached to the rear end of the machinery frame or section 42 is a gummer or cuttings removing mechanism 43 which as hereinafter pointed out more completely is optionally employed or omitted.

Extending forwardly from the motor frame or section 41 is a kerf-cutting mechanism 44 including an elongated cutter bar 45 which is of substantially standard construction and upon which there is mounted an endless cutter chain 46 provided with removable and reversible cutter bits 47. As is well known, the shortwall type of mining machine is adapted to be fed as a unit over the mine floor while cutting a kerf, the kerf being cut by first sumping the cutter bar into the solid coal and then feeding the machine laterally or across the coal face, all the while the kerf cutting mechanism 44 is in operation.

To effect the feeding of the mining machine as a unit, both at a kerf cutting speed and at a handling or higher speed and in reverse directions, the machine includes a pair of feed cable or rope drums 48 and 49 mounted on horizontal axes which are preferably in alignment, one on one side of the machine, the other on the other, as clearly illustrated in Fig. 1 of the drawings.

Drums 48 and 49 are provided with feed ropes or cables 50 and 51, respectively, which are adapted to be reeved about the sheaves of similar right and left hand rear sheave assemblies 52 and 53, respectively, and/or similar right and left hand front sheave assemblies 54 and 55, respectively.

For the present it need only be pointed out that the driving motor which drives the drums 48 and 49 tends to drive them always in the same direction, regardless of the direction of rotation of the motor, and that direction is such that it tends always to wind or pull in said ropes 50 and 51. That is, drum 48 tends always to be rotated by its driving motor in a clockwise direction, as viewed by a person facing it, and drum 49 tends always to rotate in a counterclockwise direction, as viewed by a person facing it.

As further pointed out hereinafter, the mining machine may cut coal by being fed laterally in reverse directions and to do this, slippage is provided on one of the drums 48 or 49, as the case may be, and it is allowed to pay out with a variable pull on the associated rope, as determined by the control of the associated fluid coupling. In Fig. 1 of the drawings the machine is illustrated with the ropes 50 and 51 reeved about the pulleys 52 and 55 to effect a lateral feeding of the machine to the left, as viewed from the rear thereof, or upward, as viewed from the drawings.

By the mere expedient of reeving rope 50 about the sheave of front assembly 54 and reeving rope 51 about the sheave of sheave assembly 53 and making the necessary operating adjustments on the machine, it may be fed to the right, reversely of that illustrated in said Fig. 1 of the drawings.

By extending both of the feed ropes 50 and 51 directly forwardly and to mine jacks, the machine may be fed forwardly and sumped into the solid coal. By extending the rope 50 rearwardly and around an auxiliary sheave 56, then laterally to a central sheave not illustrated but which is common on machines of this type, the machine can be pulled rearwardly away from the mine face and may be loaded onto a truck in a manner well understood in the operation of shortwall machines.

The shortwall mining machine illustrated is, of course, adapted to rest on and slide over the mine floor when in operation and the supporting surfaces of the machine are provided largely by four spaced hydraulic piston jacks or motors (when employed), those at the rear being designated 57 and those at the front being designated 58. These hydraulic jacks provide for adjusting the elevation of the cutter mechanism 44 or, in other words, the effective height of the machine and also provide for adjusting the inclination or tilt thereof on right angularly related axes relative to a horizontal plane, as hereinafter described more completely.

Figure 3:
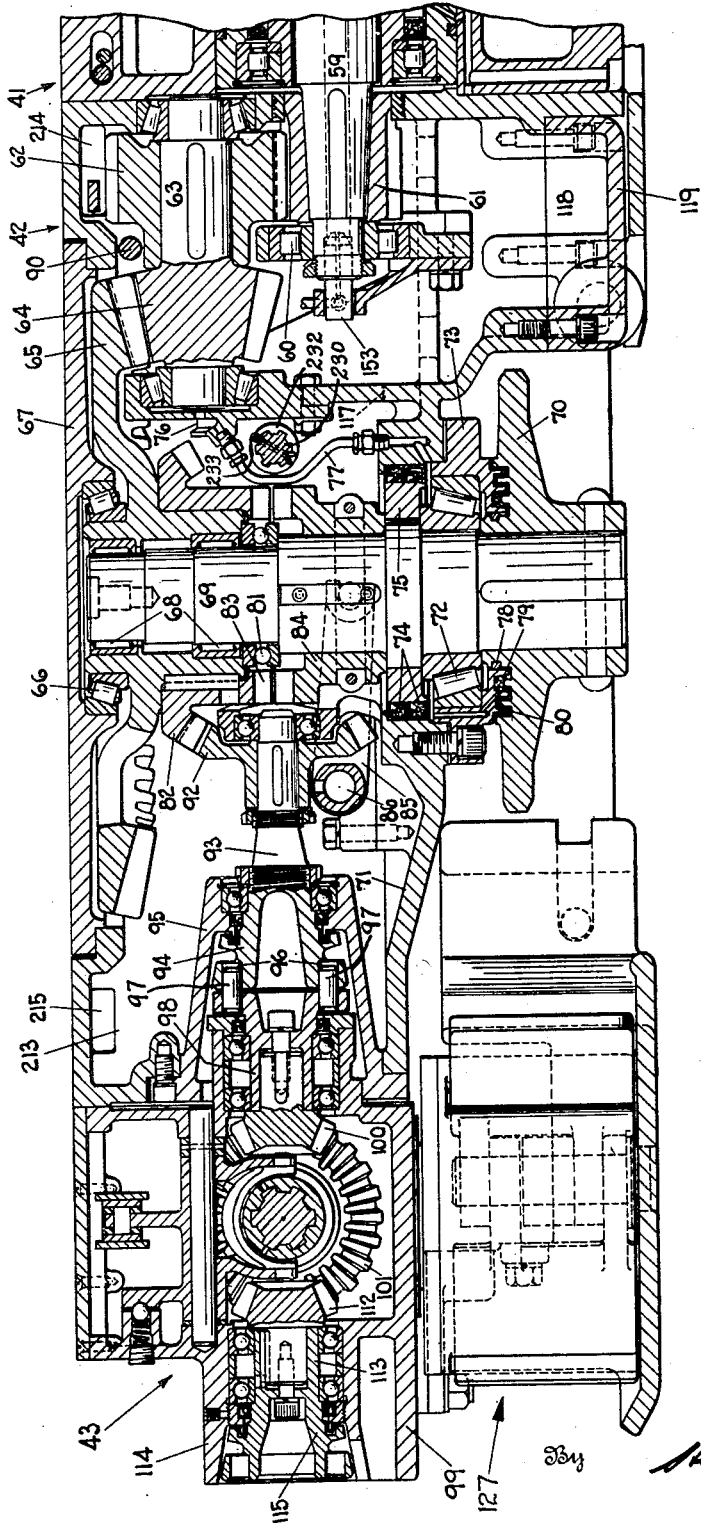
Fig. 3 is a vertical sectional view of the rear portion of the machine, taken substantially through the center thereof, showing particularly the machinery frame compartment and the gummer or cuttings removing mechanism, some parts being eliminated in the interest of clearness.

Attention is now directed particularly to Fig. 3 of the drawings and to some of the machinery or gearing which is contained within the machinery section 42 which includes the drive gearing leading to the cutter chain 46 and to the drums 48 and 49, as well as other mechanism which will be specifically pointed out.

Extending from the motor section 41 into the machinery section 42 is the end of a hollow drive shaft 59, which in the machine illustrated is the armature shaft of the motor housed within frame 41, and which is supported at its outer end on an anti-friction bearing 60 which in turn is supported on a web or integral bracket formed on the frame 42 which provides a substantially totally enclosing housing for the machinery or gears therein.

Keyed adjacent the end of the shaft 59 is a pinion 61 which meshes with a larger pinion 62 keyed to a shaft 63 having an integral bevel pinion 64, the shaft 63 being mounted in spaced bearings within the housing or frame 42. Pinion 64 meshes with a large bevel ring gear 65, the hub of which is mounted in a roller bearing 66 carried in a bearing cup in a removable top plate 67 which is removably attached to the frame 42 and forms a part of the enclosure or housing provided thereby. The hub of ring gear 65 is also mounted on spaced needle bearings 68 by which it is mounted for free rotation on a vertical or upstanding shaft 69, to the bottom of which a drive sprocket 70 for the cutter chain 46 is provided.

The drive shaft 69 extends through a hole in an elevated integral bottom plate 71 of the frame or section 42, which is preferably formed as a single steel casting, and is supported principally on a roller bearing 72 received in a removable cup 73 which is attached to the bottom plate 71 as by machine screws.

Since the sprocket 70 is, of course, exposed to the atmosphere and is outside the enclosure provided by the enclosing frame or section 42, within which enclosure there is a considerable amount of lubricating oil, though it is not filled with oil, oil seals are provided to prevent oil leakage. First of all, there is a pair of oil seals 74 provided adjacent the opening through which shaft 69 extends and a ring 75 which preferably has a tight fit with the shaft 69. Lubrication for the bearing 72 is provided by an oil catcher 76 and a pipe 77 which leads by way of a passageway around the seals 74 to the bearing 72. Oil seals at the bottom of the bearing 72 between the bottom of the cup 73 and the sprocket 70 are provided by a piston ring 78, a felt packing 79 and a labyrinth type seal 80. Obviously, other forms of oil or grease packing may be employed for those illustrated and described.

From the above description it is evident that the shaft 69 is supported in the frame or section 42 by the bearing 72 at the bottom and by the combined actions of the top bearing 66 and the needle bearings 68 through the intermediary of the hub of ring gear 65. It is further evident from the above description that there is not a permanent or direct driving connection from the ring gear 65 to the shaft 69, but on the contrary the ring gear 65 is free to rotate on said shaft 69. To support the ring gear 65 on the shaft 69 against downward axial movement, there is a thrust ball bearing 81 interposed between a shoulder on the shaft 69 and the bottom of the hub of said gear 65.

Mounted concentric with the ring gear 65 and the shaft 69 and keyed onto the hub of said ring gear 65 is a bevel gear 82. Gears 65 and 82 therefore always rotate together and each is directly driven from the drive shaft 59 and always rotates with it.

At its bottom portion the gear 82 forms a driving portion of a jaw clutch and is provided with clutch dogs 83. Providing the driven portion of said clutch is a shiftable collar 84 having dogs adapted to be engaged with or disengaged from the dogs 83. Collar 84 is shiftable upwardly and downwardly on the shaft 69 and is splined or keyed thereto so that whenever it is driven, a driving relation is effected to said shaft 69. A bifurcated shipper 85 mounted on a rotary horizontal clutch shaft 86 is provided for operating the clutch 83—84, which clutch, obviously, is the clutch for effecting a driving or non-driving relation from the driving motor within the motor section 41 to the kerf cutter chain 46.

The operating shaft 86 is carried in appropriate bearings and at one side (see Fig. 4) is provided with an upstanding lever 87 to which a forwardly extending rod 88 is connected, which rod in turn is connected to a downwardly extending lever 89 attached to a transversely extending operating shaft 90 which extends through the upright side walls of the frame 42 and is provided with an operating lever and handle 91 on each side of the mining machine so that the clutch for engaging and disengaging the cutter chain 46 may be operated from either side of the machine.

Meshing with the bevel gear 82 is a bevel gear 92 mounted on a horizontal longitudinally extending shaft 93 provided with an integral power take-off head 94, thus providing a power take-off mechanism whereby the driving motor of the mining machine may be employed to drive a supporting truck in a manner well understood in the art, whenever the gummer or cuttings removing mechanism 43 is not attached to the machine. When said gummer or cuttings removing mechanism 43 is attached to the machine, it is provided with mechanism to derive power from the power take-off 94 and in turn is provided with an extended power take-off so as still to provide for the truck drive.

The shaft 93 is mounted on spaced anti-friction ball bearings, one of which is held in a receiving cup or socket 95 attached to and forming in fact a part of the enclosing frame or housing section 42. This recessed cup or socket 95 provides a protecting enclosure for the power take-off head 94 and prevents this continuously rotating part being freely exposed where it might harm an individual when rotating.

It is obvious that the head 94 is directly and permanently connected to the drive shaft 59 so that it always rotates with said shaft 59 and in a direction determined by the direction of rotation thereof. The power take-off head 94 includes a plurality of spaced bores or holes 96 adapted to receive coupling pins 97 of an associated power receiving mechanism which may be that for driving the supporting truck for the mining machine or, as illustrated in Fig. 3 of the drawings, coupling pins 97 provide a connecting means to the gummer or cuttings removing mechanism 43 by way of a drive shaft 98 mounted in spaced anti-friction ball bearings in the enclosing frame or casing 99 of the gummer 43.

The gummer 43 and associated mechanism are fully described in my parent application Serial No. 586,979, above identified, and it is claimed in my Patent No. 2,612,363 dated September 30, 1952, but it is pointed out in connection with this application that the drive shaft 98 of the gummer 43 drives a bevel gear 100 which is in constant mesh with a pair of opposed and thus reversely driven bevel gears. These two reversely rotating gears, one of which is seen at 101, mesh with a bevel gear 112 that includes a stub shaft that interfits with and is keyed to shaft 113. Shaft 113 is mounted on spaced ball bearings on a power take-off socket or receptacle 114 formed integral with the gummer casing 99. The shaft 113 is provided with a power take-off head 115 which is of generally similar construction to the head 94 and is of similar function. That is, it provides a power take-off by which a supporting truck for the mining machine may be driven whenever the gummer is attached to the mining machine.

It may further be pointed out that there is a continuous or permanent drive between the shaft 59 and the power take-off 94 which, when the gummer is attached, also continues to the power take-off 115, and this gear train is uninterrupted by any clutches whatever so that when the gummer is attached the power take-off 115 always rotates with the motor shaft 59.

It may further be pointed out that the enclosure provided by the frame or casing of the machinery section 42 provides an oil containing compartment for the gears, shafts, bearings and mechanism therein and, of course, keeps it free of dirt. However, this compartment is not filled with oil, though oil is delivered to the various gears, bearings, etc., in a manner hereinafter described. This oil will flow from lower portions of the compartment provided by the bottom plate 71, through a drain opening 117 (Fig. 3) in a transverse integral partition in the compartment and into an oil sump 118 which is provided adjacent the forward bottom portion of said enclosure provided by the frame 42. The oil sump 118 is provided with a removable bottom closure casting or plate 119 which is removably attached to the main casting of the frame or housing 42 by machine screws, as clearly illustrated in Fig. 3 of the drawings.

Figure 4:
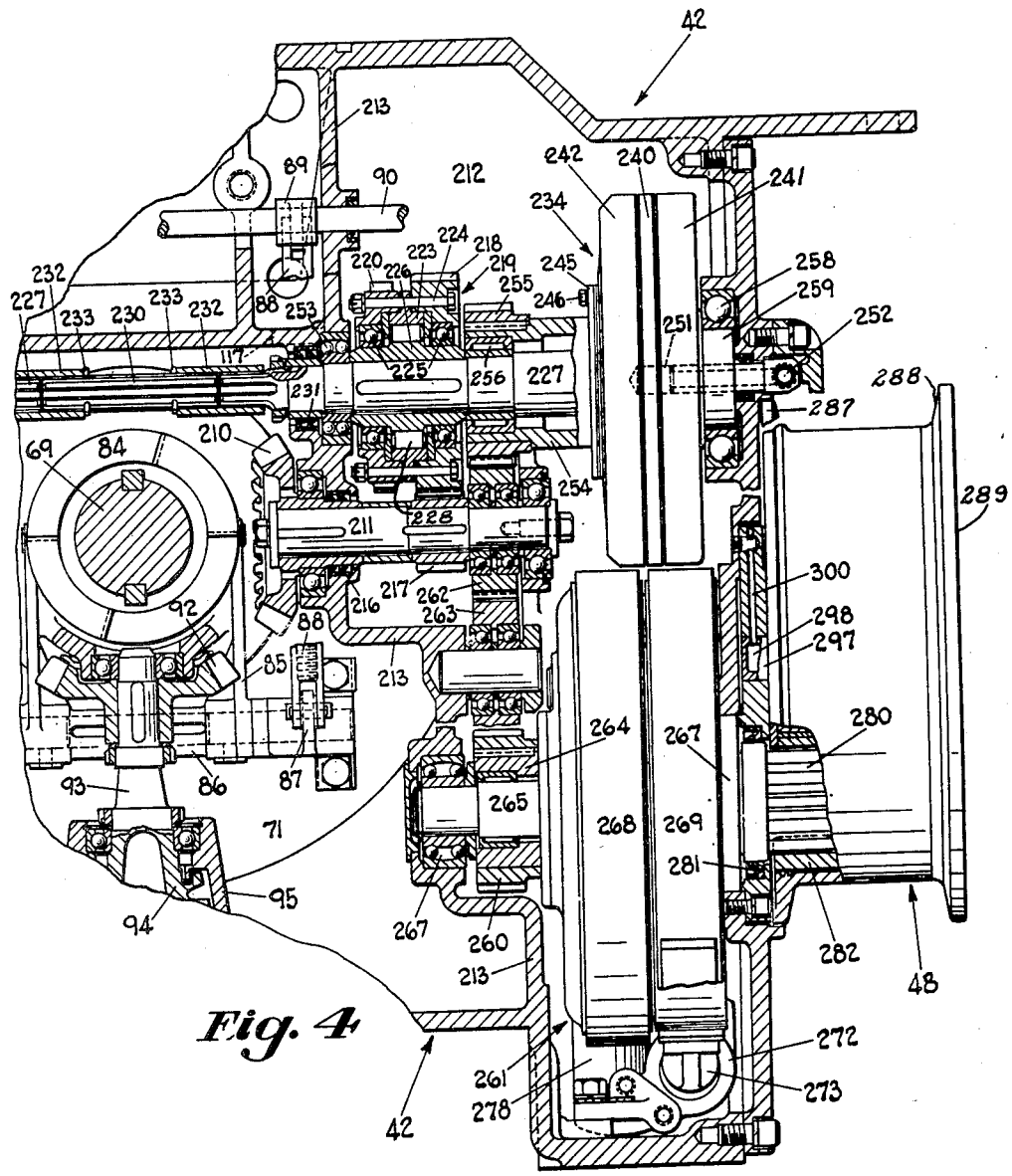
Fig. 4 is a plan view, with parts in sectional plan, showing a portion of one gear train branch leading to the right hand feed drum; it being understood that the parts are duplicated on the other side of the machine, the parts shown being in the machinery section.

Attention is now directed particularly to Figs. 3 and 4 of the drawings, the latter of which shows drive gearing leading from the gear 82, shown in Fig. 3, to the drum 48. It is to be understood that a similar complementary drive gearing is provided on the left hand side of the machine, as viewed in Fig. 4, leading to the drum 49. Such significant differences as exist will be mentioned. The gear 82 of Fig. 3 not only meshes with the power take-off driving gearing 92 previously described in connection with Fig. 3, but also continuously meshes with a pair of bevel gears, one on the right hand side which is seen in Fig. 4, the other on the left hand side which is similar thereto but not illustrated, the gear seen in Fig. 4 being designated 210. Gear 210 is keyed to a shaft 211.

Along each side of the machinery compartment 42 and forming subdivisions thereof is a pair of oil reservoirs, chambers or compartments which are adapted to be substantially filled with oil at all times, the oil reservoirs being designated generally 212, and being separated from the central machinery compartment which houses the shaft 69 etc. which is not generally filled with oil, and drains oil in the previously described sump 118. The separation of each reservoir 212 is by means of an irregular vertical integral wall or partition 213.

As hereinafter described, oil is pumped into the two reservoirs 212 and when full the oil is free to flow through ports in the top of the partition 213 and into the central machinery chamber and finally into the sump 118. For this purpose, each of the partitions 213 is provided with spaced top ports 214 and 215 at the front and rear, respectively (see Fig. 3).

The previously mentioned shaft 211 extends through the wall or partition 213 and is mounted on spaced anti-friction bearings, one of which is mounted in a cup in said wall, the other of which is mounted on a bracket formed integral with the frame 42. An oil seal 216 is provided between the shaft 211 and the wall 213, or, more accurately, between said wall and the hub of gear 218 to prevent the oil in the reservoir 212 flowing into the central machinery compartment.

Figures 23, 24, 25:
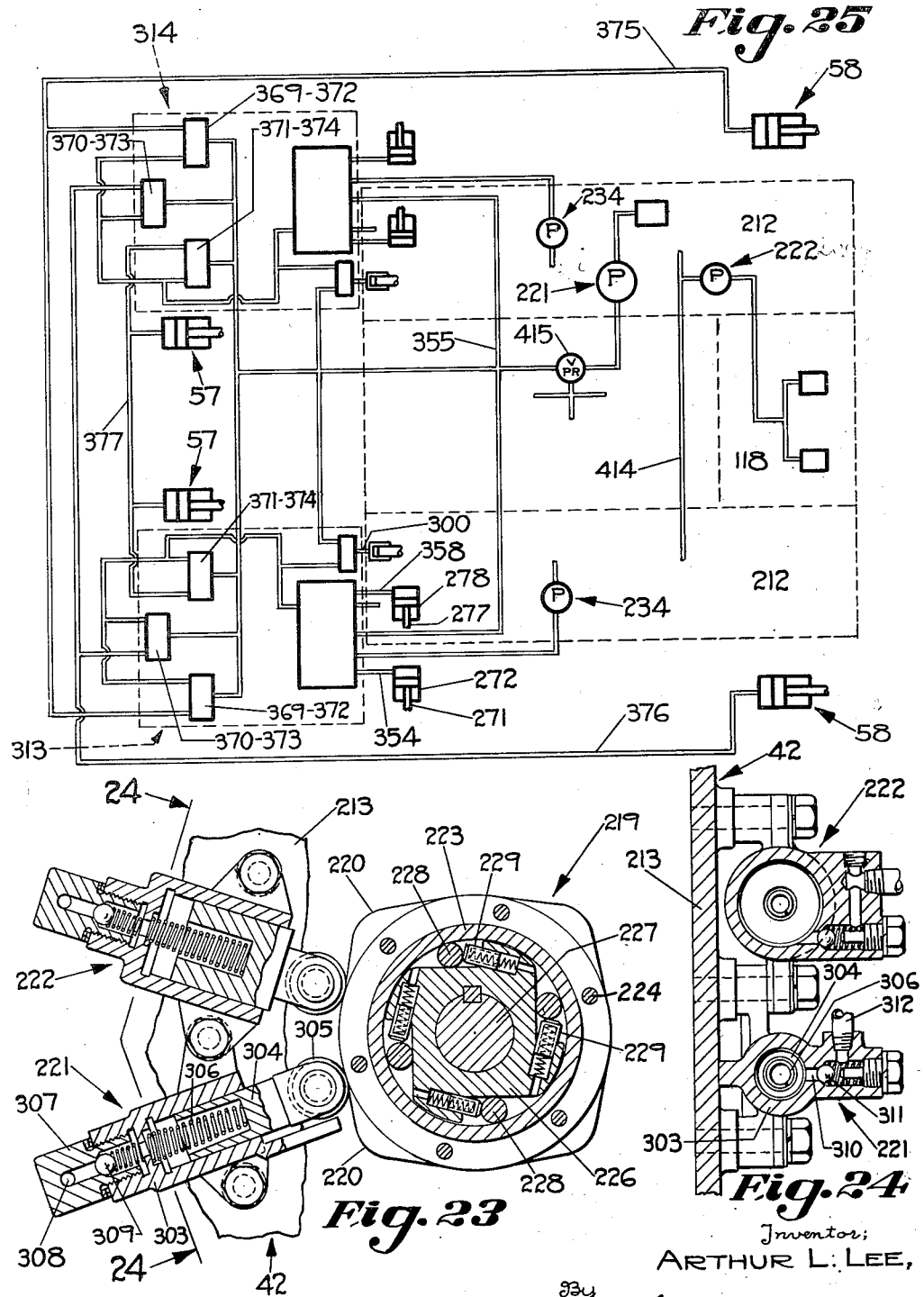
Fig. 23 is a sectional view of both the high pressure and the sump pumps and the drive mechanism therefor, including a one-way driving clutch which is an important element of the gear train leading to the feed drums.
Fig. 24 is a sectional view taken on the line 24—24 of Fig. 23, looking in the direction of the arrows.
Fig. 25 is a piping diagram as well as a schematic showing of certain parts of the mining machine, including particularly the various compartments and valve assemblies thereof.

Keyed to the shaft 211 and within the reservoir 212 is a spur gear 217 which meshes with and drives a gear 218 of an automatic one-way clutch 219 which includes as a part thereof an operating cam 220 (see also Fig. 23), which cam 220 preferably operates a high pressure pump 221 and a relatively low pressure high volume sump pump 222, as illustrated in Fig. 23 of the drawings.

In the complete machine there will only be one of each of the pumps 221 and 222 and consequently there will not be one of each on each side of the machine. In the actual machine the two pumps 221 and 222 are operated by the cam 220 on the left hand side of the machine, rather than by the cam 220 which is actually illustrated in Fig. 4 of the drawings. It is entirely optional which cam 220 is employed, the other being present though not employed as a cam.

Mounted between the cam 220 and the gear 218 is the outer race or driving member 223 of the clutch 219. The gear 218, cam 220 and race 223 are removably held together by a plurality of through bolts 224 provided with appropriate nuts. This assembly constitutes the driving part of the one-way clutch 219 and it is mounted by a pair of spaced ball bearings 225 on an inner hub 226 which is keyed to a shaft 227. The hub 226 has a central clutching portion of irregular configuration, as best seen in Fig. 23 of the drawings. This central portion of the hub 226 is provided with four notches which receive four clutching rolls 228 which are urged into wedging contact with the outer race 223 by spring-operated pushers 229.

It is obvious by reference to Fig. 23 of the drawings that if the race 223 is driven in a clockwise direction, it will roll the rolls 228 against the spring pushers 229, which will provide for relatively free rotation of the driving member 223 of said clutch 219 and consequently will not drive the shaft 227. Counterclockwise rotation of the race 223 will cause the rolls 228 to wedge between said race and the center portion of the hub 226 and thus automatically effect a driving relation between the gear 218 and the shaft 227.

The shaft 227 extends from the oil reservoir 212 into the central portion of the machinery compartment through the previously mentioned partition 213 and by way of a splined coupling 230 drives the pinion shaft 227 on the left hand side of the machine. An appropriate oil seal 231 is provided for the shaft 227 as it passes through partition 213.

The coupling 230 is readily disconnectible by virtue of a pair of splined connecting sleeves 232 which are normally held in driving relation by removable cotter pins 233, but which when removed permit the sleeves 232 to be slid axially together, thus permitting ready removal of the coupling shaft 230 from the aligned projecting splined ends of the two complementary shafts 227.

By virtue of the coupling 230, it is, of course, evident that both the right and left hand shafts 227 will always necessarily rotate in the same direction. Furthermore, this direction is so determined by the reversely operating automatic clutches 219 that the feed drums 48 and 49 always tend to rotate under the influence of the driving motor to pull in their associated feed ropes 50 and 51, respectively, regardless of the direction of rotation of the driving motor within the motor section 41.

In this connection it is, of course, evident that the complementary gears 210 on the right and left hand sides of the shaft 69 are driven in reverse directions by the gear 82 with which they are in mesh. Consequently, the shaft 211 on the right hand side of the machine will operate in a reverse direction from that on the left hand side. As a result, the driving gears 213 of the two clutches 219 will always be rotating in reverse directions. However, since these clutches are reversely connected, one of them will drive the two shafts 227, one direct the other through the coupling 230, when the motor within the motor section 41 rotates in one direction and the other clutch 219 will drive said shafts when it rotates in reverse direction. The net result is that the two shafts 227 always rotate in the same direction regardless of the direction of rotation of the motor and this action is automatic.

The shaft 227 is the driving shaft of a variable hydraulic coupling mechanism 234 which is disclosed in some detail in Figs. 5, 6, and 7 of the drawings and which is a feature of considerable importance in the gear train of the mining machine between the motor and the final driving or feeding mechanism for the kerf cutter and it is to be particularly understood that this feature, as well as others, has utility not only in the particular mining machine herein illustrated, but in other similar types or quite different types of mining machines, including other shortwall machines, shortwall-longwall, longwall and arcwall machines. It produces a characteristic in the feeding operation of a kerf cutter of a mining machine which is exceedingly desirable, particularly in that it provides a substantially uniform feed or, in the case where a feed rope is employed, it provides a substantially uniform pull on the feed rope for any setting of its control valve, which setting is preferably adjustable by an operator over a wide range.

Fundamentally, the hydraulic fluid coupling 234 is a hydraulic engine, pump or motor in which both the rotor and what is normally the stator are mounted for rotation, as well as each being mounted for rotation relative to the other.

The driving shaft 227 of the fluid coupling 234 is rigidly connected to a main rotor body or casting 235 which is provided with a plurality of cylinders 236, there being three illustrated in the particular embodiment disclosed. Each of the cylinders 236 receives a reciprocating piston 237 which is urged upwardly by a spring 238. The head of each piston 237 is provided with a cam contacting roller 239 adapted to contact a removable cam 240 which is held between a pair of removable sections 241 and 242 of the casing or housing of said fluid coupling 234. The cam 240 is of such configuration as to cause reciprocation of the pistons 237 when there is relative rotation between the rotor 235 and the housing 241, 242.

The interior of the casing or housing 241, 242 is completely filled with oil at all times since it is submerged in oil in reservoir 212 and the oil therein is free to flow into said casing or housing by way of screened inlet ports 243 protected by filter screens 244 which are held in place by arcuate strips 245 and screws 246. The oil within the casing 241, 242 will flow into each of the cylinders 236, as the pistons 237 move upwardly by way of piston inlet ports 247 in the heads of said pistons 237, each of which is controlled by a one-way spring-pressed check valve 248. As each piston 237 moves inwardly, the oil in the cylinder 236 is forced through a spring-pressed ball check valve 249 and a passageway 250 which leads to a central bore, conduit or passageway 251 which is common to all of the feed passageways 250 and which is located at the axis of rotation of said rotor 235.

Reverting now to Fig. 4 of the drawings, it will be seen that a stationary conduit receiving fitting 252 is connected to the frame 42 and extends into the central bore 251 and is provided with a relatively high pressure stuffing box connection therewith to provide for rotation of the rotor 235 while the fitting 252 does not rotate. The left hand end of the shaft 227, as viewed in Fig. 4, is supported in the partition 213 by an anti-friction ball bearing 253.

The section 242 of the fluid coupling housing is provided with an integral neck 254 to which a gear 255 is keyed. The housing 241, 242 is supported on the shaft 227 by spaced anti-friction needle bearings 256 and 257 (see Fig. 6), and the support for the right-hand end of said shaft 227 is by way of bearing 257 and an anti-friction ball bearing 258 interposed between an integral cup 259 of the housing section 241 and the outer upright wall of the frame 42, as clearly illustrated in Fig. 4 of the drawings.

The shaft 227, of course, acts as the driving shaft of the fluid coupling 234, and the neck 254 in effect acts as the driven shaft thereof to drive the gear 255. Gear 255 drives a gear 260 of a two-speed planetary transmission 261 by way of a pair of intermediate reach gears 262 and 263.

The gear 260 is keyed to the driving hub or shaft 264 of the planetary transmission 261 which, per se, is of essentially standard construction and therefore will not be described in detail, except for certain novel features. This transmission is disclosed in some detail in Figs. 8 and 9 of the drawings.

The transmission 261 is supported as a unit on what constitutes the driven shaft 265 thereof, which is mounted in spaced anti-friction bearings 267 in the frame 42. As is customary with two-speed planetary transmissions of this type, it is provided with a high speed or fast friction band 268 and with a low speed or slow friction band 269. When the fast band 268 is tightened, a high speed drive is effected and when the slow band 269 is tightened a slow speed drive is effected. In the control system employed, one of these bands is always tightened and the other released so that a high or low speed connection is always provided.

Planetary transmissions are quite commonly employed, both as transmission or gear ratio changing devices and as clutches, as this is an inherent characteristic of the band construction which provides for progressive slowing down and ultimate stopping of their associated drums. In general, however, this action of contracting or tightening the bands is done slowly and generally by manually operable means to prevent too rapid application of the clutching action. In general it has been considered undesirable to provide high pressure type hydraulically controlled actuators or piston motors for tightening or applying the brake bands.

In my arrangement, however, the brake bands are employed largely, though not exclusively, as rigid holding devices for their associated drums, since the clutching or flexible coupling action is provided by the hydraulic fluid coupling and in general once a brake band is applied, there will be substantially no slipping of the associated drum. As a consequence, I am able to employ high pressure hydraulic actuators or piston motors, one for each of the brake bands 268 and 269 of each of the two transmissions 261, there, of course, being one on each side of the machine individual to each drum 48 and 49. This makes possible the provision of a very powerful but small actuating means for said brake bands 268 and 269.

Figure 8:
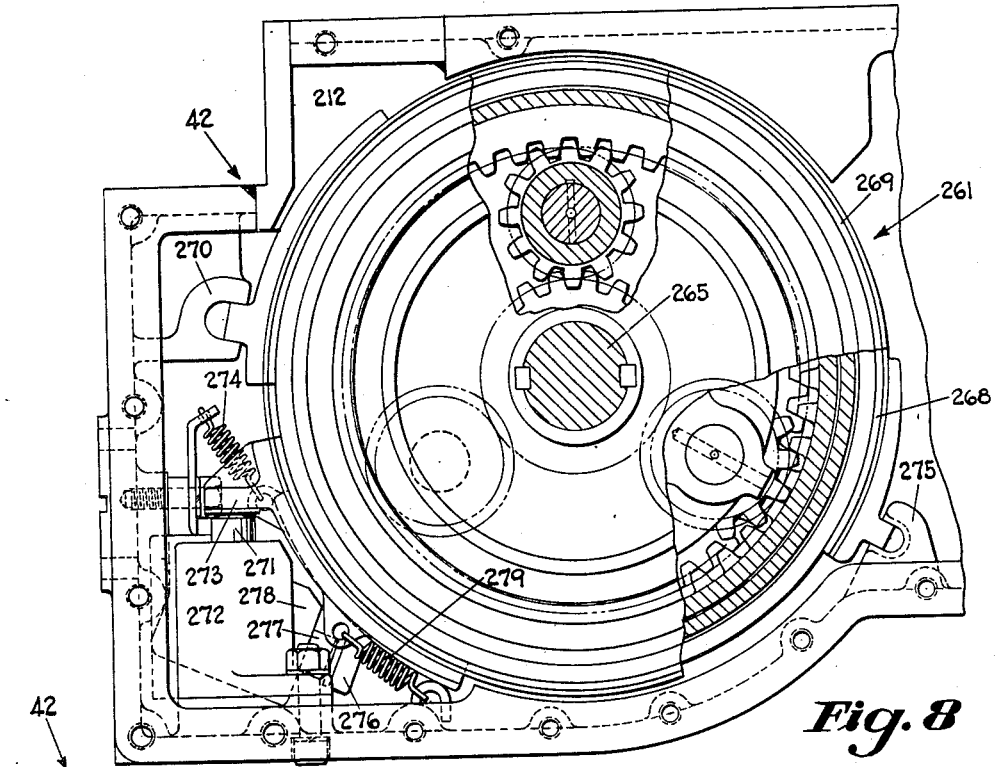
Fig. 8 is a front elevational view of a two-speed planetary gearing for one of the drums, with parts broken away and shown in section.
Figure 9:
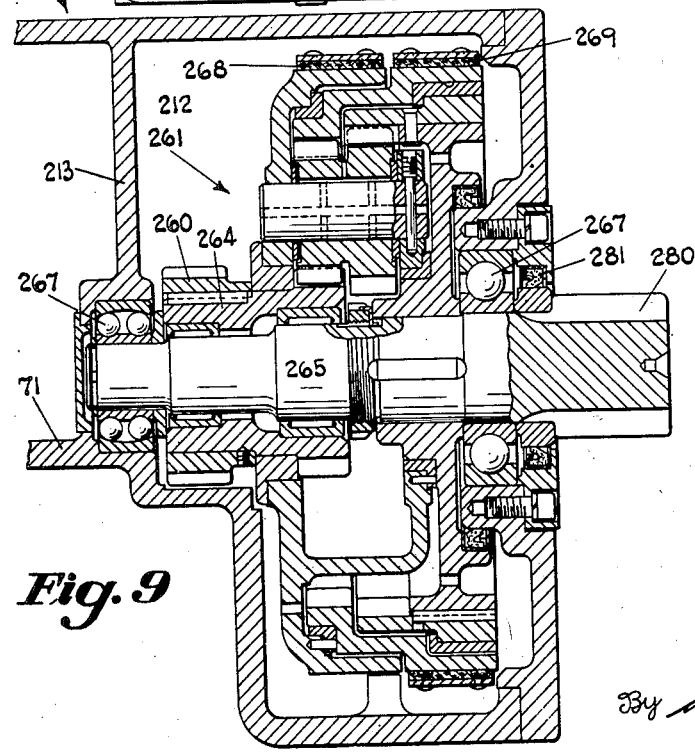
Fig. 9 is a sectional elevational view of the two-speed planetary gearing of Fig. 8.

As illustrated in Fig. 8 of the drawings, one end of the slow band 269 is anchored to the frame 42 by a bracket 270 and the opposite end thereof is adjustable by means of an abutting piston 271 of a hydraulic piston motor or actuator 272, which piston 271 abuts a brake band lug 273. Slow band 269 is urged to slack or free position by a spring 279. It is obvious that by applying hydraulic fluid under pressure to the motor or actuator 272, the slow band 269 may be clamped onto its drum to provide a slow speed or high reduction drive to the output shaft 265.

One end of the fast or high speed band 268 is anchored to a bracket 275 and the other end is provided with a lug 276 which is actuated by a piston 277 of a high pressure hydraulic motor or actuator 278 which is located adjacent the actuator 272, but the piston extends downwardly in a sloping direction, as clearly illustrated in Fig. 8 of the drawings. Fast band 268 is urged to slack or free position by a spring 274.

As hereinafter described, a common operating valve is provided for the actuators 272 and 278 which provides for their selective actuation. The shaft 265 is provided at its outer end with an integral spur gear 280, and an oil seal 281 is provided where said shaft extends through the outer upright wall of the frame 42 thereby preventing a loss of oil.

As illustrated in Fig. 4 of the drawings, the spur gear 280 extends into the rope drum 48 and meshes with an internal gear 282 which is formed as an integral part of a driving member of the drum, the structure of which is best seen in Figs. 10 and 11 of the drawings. The drum 49 is of similar structure, except it is mounted on the reverse side of the machine. The drum 48 includes a hollow supporting post 283 which has a large base removably attached to the outer right hand side wall of the frame 42 and which carries a pair of spaced anti-friction bearings 284 which receive and support the hub of a main casting 285 of the driven or rope receiving portion of the drum 48. Journaled on a bearing on the outside of the hub of said casting 285 is the hub of a driving portion 286 of said drum 48, of which the internal gear 282 is an integral part.

In operation, the driving member 286 and the driven member 285 are, of course, connected together by clutching means, and the rope 50 is wrapped about the external surface of the main casting 285 between inner flange 287 and outer flange 288, the latter of which is formed on a removable plate 289 attached to the casting 285 by machine screws. In a cylindrical well or socket formed partially in the plate 289 and partially in the casting 285 is an anchor button 290, to which one end of the cable 50 is anchored and held.

To effect a selective driving or non-driving relation between the main casting 285 and the driving portion 286, a spider 291 is provided which has a plurality of drive pins 292 extending through bushed openings in the casting 285 and adapted to extend selectively into aligned openings 293 in the driving member 286, thereby providing a clutching arrangement. Actuation of said clutch is provided by a piston 294 formed integral with the spider 291 and extending into a cylinder 295 formed in and along the axis of the post 283.

A spring 296 is received in a recess in the piston 294 and presses against the plate 289 to urge the pins 292 into clutch engaging position. As illustrated in Fig. 11 of the drawings, the clutch is in its disengaged position and thus the rope receiving member of the drum 48 is free to rotate, subject to some restriction as hereinafter described. To provide for this disengaging action, at the left hand end, the post 283 carries an insert 297 which is a high pressure cylinder providing a hydraulic fluid receiving chamber 298 into which an operating piston 299 extends, the outer end of which abuts the spring pressed piston 294. It is thus obvious that hydraulic fluid delivered to the chamber 298 will act through piston 299 and piston 294 to disengage the clutch pins 292 and thus free the outer or driven member of the drum 48.

By reference to Fig. 4, it will be seen that hydraulic fluid is delivered to the chamber 298 by way of conduit 300 which is connected to the high pressure hydraulic system, as hereinafter described, by way of any desired fitting.

As best illustrated in Fig. 12 of the drawings, a plurality of spring-pressed friction buttons 301 are provided in cylindrical bores in casting 285 and are pressed by springs 302 against a face of the driving member 286. Thus when the clutch pins 292 are disengaged, an operator can pull the rope 50 off the drum 48 against a slight drag or friction which will prevent undesirable free rotation of the driven member of said drum 48.

Figs. 23 and 24 of the drawings show in some detail the structure of the low pressure high volume sump pump 222 and the low volume high pressure pump 221. These pumps are of similar construction, though having different size cylinders and pistons. A detailed description of pump 221 will therefore suffice for both.

Said pump 221 includes a cylinder 303 having a piston 304 therein, the exposed end of which is provided with a roller 305 adapted to roll on the cam 220 of one of the clutches 219. A spring 306 urges the piston roller 305 into contact with the cam 220. Cylinder 303 is provided with a removable head 307 having a suction conduit or passageway 308 therein which leads to the interior of cylinder 303 by way of spring-pressed check valve 309. As the piston 304 moves to the right or out of the cylinder 303, oil is sucked in by way of conduit 308 past the ball check valve 309. On the return stroke of the piston 304 the oil is forced out of it by way of exhaust or pressure conduit 310 (see Fig. 24) past spring-pressed ball check valve 311 and into a pressure or output pipe or conduit 312.

As clearly indicated in Fig. 23, both of the pumps 221 and 222 are driven by the same cam 220. Obviously, the direction of rotation of the cam 220 is immaterial to the action of these pumps.

Attention is now directed particularly to Figs. 13 to 22, inclusive, of the drawings, and to the structure of various valves and control or actuating mechanism therefor. It may first be noted that there are two similar combination valve assemblies which are of reverse construction, however, and which are adapted to be mounted on and demounted from the opposite rear corners of the section 42. These valve assemblies (see Fig. 19) are designated 313 and 314, respectively, and their positions on the mining machine are illustrated best in Figs. 1 and 2 of the drawings. Except for the fact that one of them is a right hand device and the other a left hand device they are of substantially the same construction and a detailed description of valve 313 will suffice for an understanding of the structure of both.

Said valve assembly 313 includes a main body, block or casing 315 and removable caps or heads 316 and 317 at opposite ends thereof. Located substantially at the center of the main body 315 and extending into both the caps or heads 316 and 317 is a cylindrical bore or opening 318 which is the main cylinder of a balanced adjustable pressure relief valve which variably controls the slip and thus adjusts the torque of the fluid coupling or, in other words, controls the pull in pounds on one of the feed ropes 50 and 51, there, of course, being an individual fluid coupling and an individual control valve for each drum 48 and 49 and associated feed ropes 50 and 51.

Stated another way, this control valve controls the pressure, and thus the torque, at which the fixed or unitary driving relation between the rotor 235 and the frame 241, 242 is broken and their relative rotation starts with a consequent flow of oil through hereinafter described valve 331, 332. The volume of said oil will be directly proportional to said slip, with zero volume at no slip or direct driving.

Within the cylinder 318 is a helical spring 319, one end of which abuts a piston 320. At the other end and slidable in the cylinder 318 is a hollow sleeve 321 which is manually adjustable, as hereinafter described, to compress the spring 319.

Figure 13:
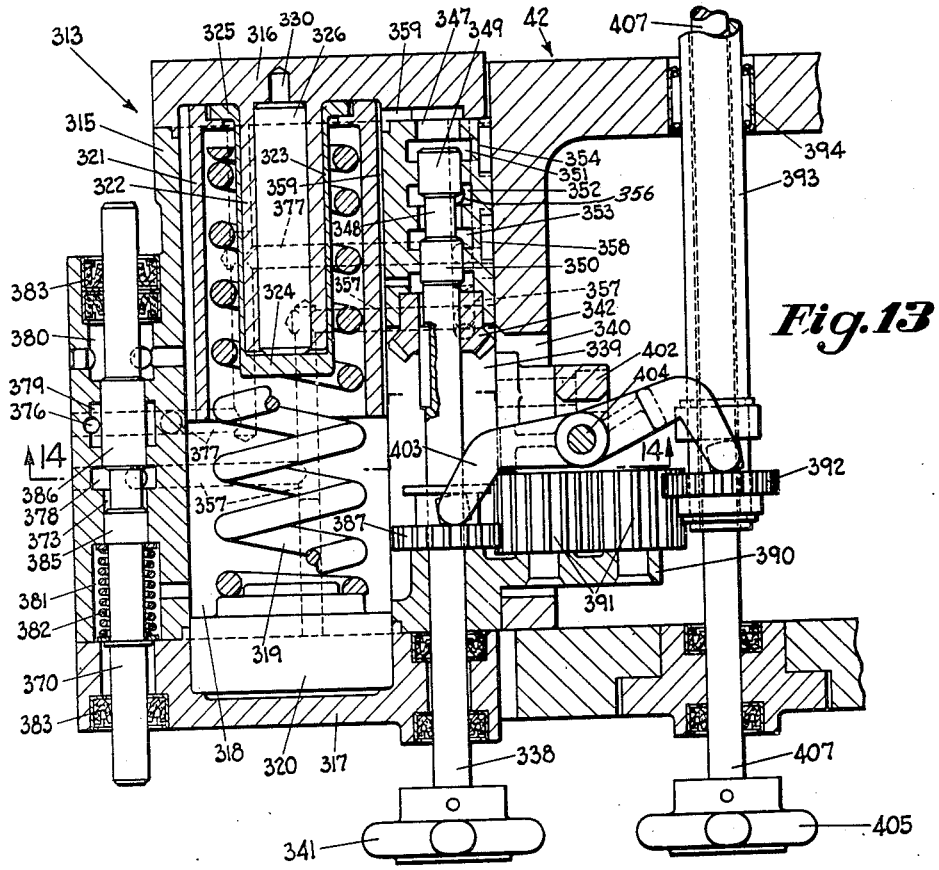
Fig. 13 is a sectional plan view showing various hydraulic control valves of a combination or valve assembly which is mountable as a unit on one corner of the mining machine frame.
Figure 16:
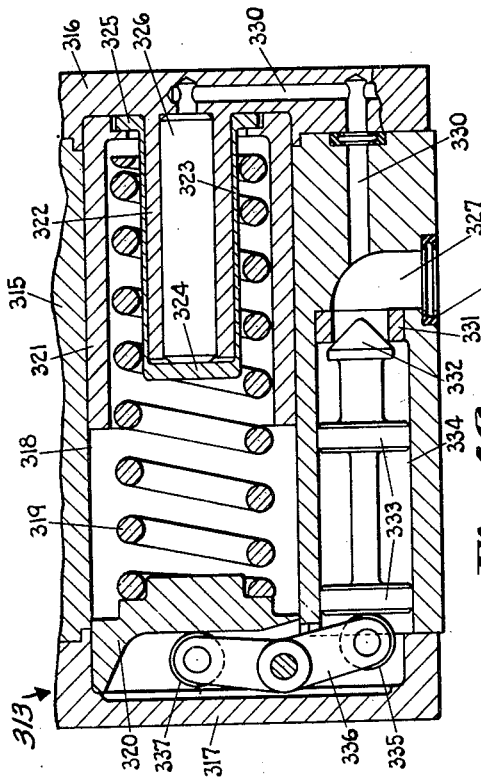
Fig. 16 is a sectional view taken on the line 16—16 of Fig. 14, looking in the direction of the arrows.

As illustrated in Figs. 13 and 16 of the drawings, when the sleeve 321 is moved to one extreme position, which is the zero pressure position, it will move out of contact with the adjacent end of the spring 319. As the sleeve 321 is moved downwardly, as viewed in Fig. 13, or to the left, as viewed in Fig. 16, or, in other words, toward the piston 320, it will travel a small predetermined distance before contacting the spring 319 and further continuous movement thereof will compress the spring 319 and thus build up progressively the force exerted by the spring on said sleeve 321. This force is balanced by hydraulic fluid pressure so the sleeve 321 will remain at any adjusted position.

The head 316 is provided with an integral cylinder 322 which extends into the cylinder 318 and along the axis thereof and which on its outer cylindrical surface slidably receives a sleeve 323 having an integral head 324 and a flanged base 325, which flanged base overlaps a flange on the sleeve 321 so that any force transmitted to the head 324 will be delivered by the sleeve 323 through the flanged base 325 to the sleeve 321. Within the cylinder 322 is an elongated piston 326 adapted to push on the head 324.

Figure 15:
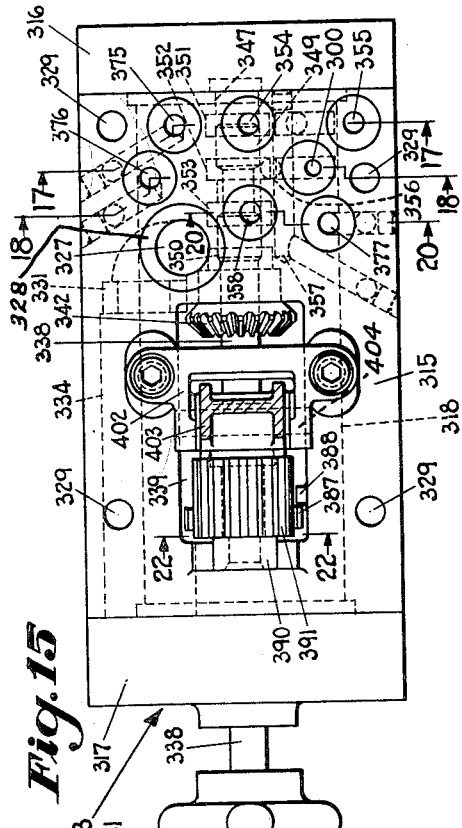
Fig. 15 is an elevational view of one side of the valve block or assembly shown in Figs. 13 and 14.

As best seen in Fig. 16 of the drawings, the main casting 315 is provided with a hydraulic fluid inlet chamber 327 provided with an appropriate sealing ring 328 which will effect a seal with the flat plate of the frame 42 to which the block 315 is removably attached as a unit with four through bolts which extend through four spaced holes 329 (see Fig. 15). It may be stated that this manner of providing connections between the large number of bores or passageways in the block or casing 315 is uniformly followed, thus providing for ready attachment or detachment of the combination valve assembly 313 and insuring a leak proof connection with associated conduits.

Hydraulic fluid received in the inlet chamber 327 passes by way of bores or passageways 330 in the block 315 and head 316 to the interior of cylinder 322, thus tending to move the piston 326 in a direction to compress the spring 319. This hydraulic fluid actually produces a balancing pressure to hold the sleeve 321 at any adjusted position, the result of which is to maintain the hydraulic fluid discharge from the associated torque converter 234 at a predetermined pressure which may be adjusted at any value from zero to the maximum selected value, by the manual control means for sleeve 321.

Figure 14:
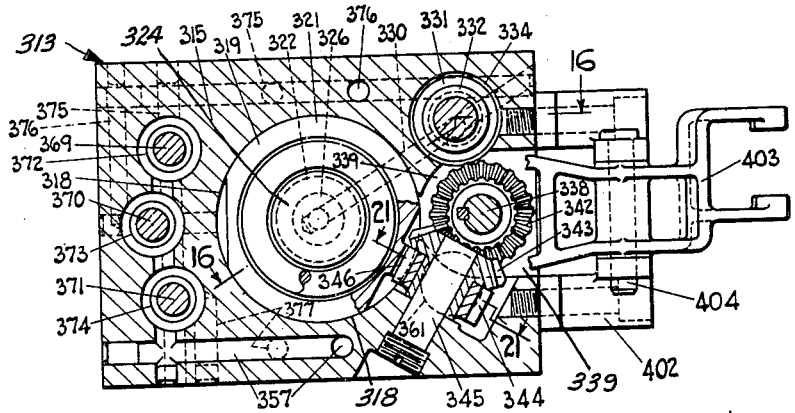
Fig. 14 is a sectional view taken on the line 14—14 of Fig. 13, looking in the direction of the arrows.

Hydraulic fluid under pressure delivered to the chamber 327 is also delivered to a pressure relief valve including a seal ring 331 (see Fig. 16) and a poppet 332 having a pair of integral spaced guide pistons 333 adapted to slide in a cylinder or bore 334 in the block 315. Bore 334 is open at its bottom, as seen in Fig. 14, and communicates with an open chamber 339 (see Figs. 13 and 14), which chamber 339 communicates with the interior of cylinder 318 and with a large hole or opening 340 in the back upright plate of the frame 42, as clearly illustrated in Fig. 13 of the drawings, whereby the oil discharged through the high pressure relief valve 331, 332 will flow from cylinder 334 through chamber 339 and hole or opening 340 into an oil reservoir 212. It is also evident from the above that oil in the cylinder 318 is also drained to a reservoir 212 by way of chamber 339 and hole 340.

The head of the left hand guide piston 333, as viewed in Fig. 16, abuts a roller 335 mounted on one end of a pivoted arm 336, the other end of which arm carries a roller 337 which rides on the bottom of a groove in the piston 320, the groove being provided to receive said arm 336.

It is evident that any force developed by the compression of spring 319 will be transmitted through the pivot arm 336 to the poppet 332 and consequently the pressure at which the relief valve 331, 332 opens will be determined by the position of the sleeve 321. Furthermore, the sleeve 321 will be balanced in any position to which it is adjusted, by virtue of the fact that the hydraulic fluid in the chamber 327 not only acts on the poppet 332, but is delivered to the cylinder 322 and piston 326. The internal diameter of the seal ring 331 is the same size as the internal diameter of the cylinder 322 and consequently, since the hydraulic fluid operates on two similar areas in opposing directions, these forces will be balanced, thus maintaining the spring 319 compressed in any position to which it is once adjusted by adjusting the sleeve 321.

The manner of adjusting the position of the sleeve 321, thereby to adjust the pull which will be exerted on the rope 50 or 51, as the case may be, will now be described. Referring particularly to Fig. 13 of the drawings, it will be seen that an operating shaft 338 extends through spaced oil seals, through a bore in the cap 317 and through a bore in the casing 315, and into and through the open chamber 339. This operating shaft 338 is mounted for both rotary and longitudinal, reciprocatory or axial movement, the rotary motion being employed to control variably the pressure at which the relief valve 331, 332 operates, by adjusting the sleeve 321, and the reciprocatory motion being employed to energize selectively the hydraulic motors or actuators 272 and 278 for operating the two-speed planetary transmission 261 associated therewith.

The valve 313 is, of course, individual to one fluid coupling 234 and one planetary transmission 261, while the valve 314 is individual to the other fluid coupling 234 and transmission 261. Valve assembly 313 controls the fluid coupling and transmission on the right hand side of the machine, as viewed from the rear in Fig. 1, which controls the drum 48, and the valve 314 similarly controls the fluid coupling and transmission on the left hand side leading to drum 49. Valve assemblies 313 and 314 also have valves which control the clutch mechanisms 291, 292, etc., of the drums 48 and 49, respectively, as hereinafter described more completely.

Rotary motion of the operating shaft 338 may be imparted thereto by an operating knob or handle 341 and this rotary motion is transmitted to a bevel pinion 342 (see Figs. 13 and 14), which is feathered to the shaft 338, thereby providing for reciprocation of said shaft 338 with respect to said gear 342. Gear 342 meshes with a bevel pinion 343 (see Fig. 14), on the hub of which is a pinion 344, said two pinions being mounted for rotation on a shaft 345.

As best illustrated in Figs. 14 and 21 of the drawings, the pinion 344 meshes with a rack 346 formed as an integral part of the sleeve 321. It is obvious, therefore, that by rotating the shaft 338 the sleeve 321 can be adjusted longitudinally along the cylinder 318 and, as previously described, the hydraulic fluid pressure at which the associated fluid coupling discharges will thereby be adjusted and this hydraulic fluid will produce a balanced condition on said fluid coupling control valve so that the discharge pressure thereof may be maintained substantially constant at any selected value from zero to the maximum discharge pressure. This, of course, will control the pull on the associated rope, such as the rope 50, and purely by way of illustration of the possible variation of this pull, it may be from zero to 20,000 pounds when the low speed of the transmission 261 is connected, which is the feeding speed used when the machine is cutting a kerf, or it may be from zero to 4000 pounds pull when the high speed of the transmission 261 is connected, which is the handling speed for the machine. These illustrative rope pulls are, of course, only such and are by no means to be considered as restricting.

It may further be mentioned that when the machine is in operation and being fed to cut a kerf the adjustment of the fluid coupling control valve at any value will operate to maintain a substantially constant pull on the feed rope and, consequently, the speed at which the machine will be fed will be determined by the hardness of the cutting. For example, should the coal be soft or easy to cut, the machine will cut rapidly. Where difficult cutting is encountered, the machine will automatically compensate for the increased hardness of cutting, and feed through the coal at a slower rate.

It is to be particularly noted that this automatic control is responsive directly to the torque of the feed mechanism or, otherwise expressed, on the pull on the feed rope. Thus there is no time lag which need be overcome as is the case in those devices which atempt to control feeding speed by release responsive to overloading of the feeding or cutting motor. Experience indicates that this directly responsive type of feed control is much more satisfactory than other known types and eliminates all tendency for chattering, bucking and the like.

As previously mentioned, the shaft 338 is also employed to control the transmission 261. This is accomplished by a single control valve operated by longitudinal, rectilinear or reciprocatory motion of the shaft 338. Said control valve includes a bore or cylinder 347 provided in the casing 315 (see Fig. 13), into which a spool 348 reciprocates, said spool 348 being attached to or formed as an integral part of the shaft 338. Spool 348 includes a pair of spaced lands 349 and 350.

Adjacent its periphery the cylinder or bore 347 is provided with three circumferential chambers 351, 352 and 353. The chamber 351 is connected by an appropriate conduit 354 to the slow band actuator or motor 272 of the associated planetary transmission 261 (see Fig. 25). The chamber 352 is connected with a high pressure or output pipe or conduit 355 (see Fig. 25), of the high pressure pump 221 over a path which includes a number of bores in the casing 315, which path will be described hereinafter. For the time being, it may be pointed out that this path includes a bore 356 (see Figs. 13 and 18), which communicates with the bottom of the chamber 352 and which is closed by a plug, the bore 356 communicating with a longitudinally extending bore 357 (see Figs. 13, 17 and 18), formed in the casing 315. The chamber 353 communicates by a conduit 358 with the fast band actuator 278 of the associated planetary transmission 261.

With the spool 348 in the position illustrated in Fig. 13 of the drawings, the fast band piston motor 278 will be actuated, since hydraulic fluid under pressure in the chamber 352 will flow through the bore 347 to the chamber 358 which is in communication with said actuator or piston motor 278. Under these conditions, chamber 351 which communicates with the slow band piston motor 272 will be connected to drain by way of the rear end of bore 347 which communicates, by means of a passageway 359 in the head 316, with the interior of cylinder 318 which, as previously described, is connected to an oil reservoir 212.

Figure 17:
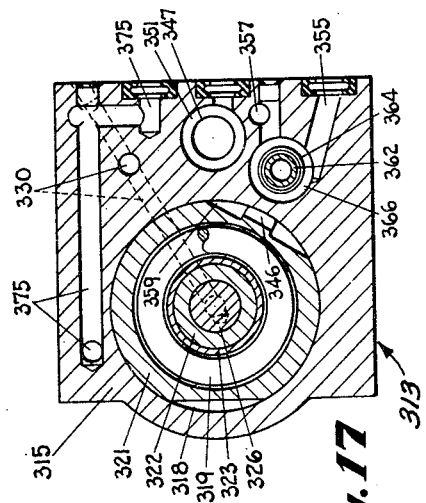
Fig. 17 is a sectional elevational view taken on the line 17—17 of Fig. 15, looking in the direction of the arrows.
Figure 18:
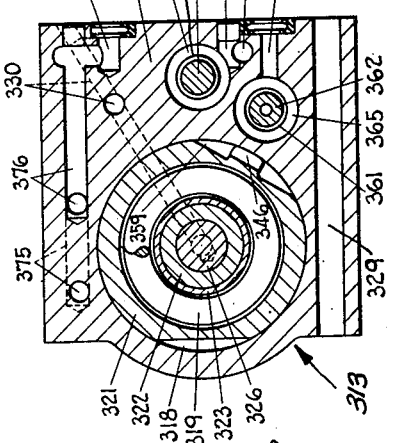
Fig. 18 is a sectional elevational view taken on the line 18—18 of Fig. 15, looking in the direction of the arrows.

As clearly illustrated, for example, in Figs. 13, 17 and 18 of the drawings, portions of the cylindrical periphery of the sleeve 321 are cut away to provide a free path for oil discharged from cylinder 347. Therefore, by pulling outwardly on the handle 341 a fast speed drive will be effected from the driving motor to the drum 48. By pushing the handle 341 inwardly, the spool 348 is, of course, also moved inwardly and pressure chamber 352 is placed in communication with chamber 351 to actuate the slow speed motor or actuator 272 and to connect the high speed motor or actuator 278 to drain through the bore 347, which at its bottom, as viewed in Fig. 13, also communicates with the interior of cylinder 318 over an obvious bore or passageway.

It is thus evident that the operating handle 341 and the shaft 338 which it controls serves a double function of controlling by different actions the pressure relief valve for the associated fluid coupling and the two-speed planetary transmission which is driven through said fluid coupling.

Attention is now directed particularly to Fig. 21 of the drawings and to additional control provided by the valve assembly 313. First of all, it may be mentioned that in association with the previously mentioned gear 344 for adjusting sleeve 321 there is provided a spring-pressed ball detent 360 which performs a double function of making a clicking noise as each tooth passes it, thereby indicating to the operator that a predetermined amount of adjustment has been effected on the sleeve 321, and also aiding to hold the said sleeve in adjusted position to prevent hunting which might be caused by vibration of the machine.

Furthermore, it may here be mentioned that the operating handle 341 and all similar operating handles are provided with a pointer or index, thus designating its position, the pointer being best seen in Fig. 2 of the drawings. The pointer, for example, may point upwardly when the sleeve 321 is adjusted to its zero position, as illustrated in Figs. 13, 16 and 21 of the drawings.

A control valve for the clutch 291—298, etc., of the drum 48 is also provided in the valve assembly 313 and it is controlled automatically by the actuation of the sleeve 321 under the rotary control of handle 341. This control valve includes a cylindrical bore 361 (see Fig. 21), formed in the casing 315, in which a spool 362 reciprocates. Spool 362 is provided with spaced lands 363 and 364 and bore 361 is provided with spaced chambers 365 and 366. Chamber 365 communicates with the chamber 298 of the actuating motor of drum clutch 291, 292, etc., of drum 48 over the previously mentioned conduit which is formed by interconnected bores, pipes and the like, designated by reference character 300.

The chamber 366 communicates with the high pressure conduit 355 leading from the high pressure pump 221 over a bore in the block 315, as illustrated in Fig. 17 of the drawings. This chamber 366 also communicates over a plugged bore in the casing 315 with the previously mentioned bore 357, by which the hydraulic fluid under pressure from pump 221 is delivered to the chamber 352 by way of bore 356. As is hereinafter pointed out more completely, there are a number of bores in the block 315 by which the hydraulic fluid under pressure delivered from the high pressure conduit 355, first to the chamber 366 and then to the bore 357, is delivered to other control valves, particularly spool slide valves which are employed to control the elevating jacks 57 and 58.

Returning now to a consideration of the structure illustrated in Fig. 21, the right hand end of the spool 362 is provided with a rigidly attached operating arm 367 which extends into the path of the sleeve 321. A helical spring 368 abuts the head 316 and extends into a recess in the spool 362, urging it to the left, as viewed in said Fig. 21.

When the sleeve 321 is adjusted to the zero torque or zero pressure position so that the fluid coupling will deliver substantially no torque to the drum 48, it will automatically adjust the spool 362 so as to interconnect chambers 365 and 366, thus delivering hydraulic fluid under pressure to actuate the clutch of the drum 48 and disengage the outer member of said drum, thus providing for its relatively free rotation, as above described.

As soon as the sleeve 321 is adjusted from its zero torque or zero pressure position or during the first portion of its travel before it contacts the spring 319, the spool 362 will operate under the influence of the spring 368 to block the pressure chamber 366 and connect the drum clutch motor chamber 365 to drain by way of open chamber 339, thus draining the motor or piston actuator 298, 299 of the drum 48 and allowing the spring 296 thereof to operate its clutch and effect a driving relation between the driving member 286 and the main casting or driven portion thereof. Thus, drum 48 is effectively connected to the driving motor 154 through the fluid coupling and the planetary transmission as an incident to building up the discharge pressure of the fluid coupling and it is automatically disconnected to rotate freely as an incident to the reduction of said discharge pressure to zero.

Adjacent its rear portion the combination valve assembly 313 includes three similar slide valves including spools 369, 370 and 371 (see Fig. 14), adapted to slide in cylindrical bores 372, 373 and 374, respectively, formed in the casing or block 315. The slide valve 369, 372 controls the left front jack 58, the slide valve 370, 373 controls the right front jack 58, and the slide valve 371, 374 controls the two rear jacks 57 by way of conduits 375, 376 and 377, respectively, which include a plurality of transverse and longitudinally connecting bores in the block 315, some of which are illustrated in Figs. 13, 14, 15, 17 and 18 of the drawings.

The structures of these three valves are similar and thus a description of valve 370, 373 which is disclosed in detail in Fig. 13 of the drawings will suffice for an understanding of the construction of the other two. Cylinder or bore 373 is provided with a pressure chamber 378 and, as clearly illustrated in Fig. 14 of the drawings, the three pressure chambers of these three valves are all connected by interconnecting passageways or bores and they are connected with the previously mentioned pressure passageway 357 which extends to them by longitudinal and transverse bores which may be seen by reference to Figs. 13 and 14 of the drawings. Thus, hydraulic fluid under pressure from the pump 221 is available at all times in the vertically aligned chambers of said three valves, including chamber 378 and its counterpart in each of the other two valves. Adjacent the bore 373 there is also a motor chamber 379 which communicates with the previously mentioned conduit 376 leading to the right hand front jack 58.

Adjacent the bore 373 there are also spaced drain chambers 380 and 381, both of which are connected to the interior of cylinder 318 over obvious drain bores seen in Fig. 13 of the drawings. Within the drain chamber 381 there is a spool centering spring 382 which will return the spool 370 to its center position, as illstrated in Fig. 13, whenever its projecting operating ends are released. Oil seals 383 are provided adjacent the projecting operating portions of the spool 370.

It is obvious, by reference to Fig. 13 of the drawings, that opposite ends of the spools 369, 370 and 371 extend outwardly from the casing, body or block 315 and thus may be readily operated in reverse directions by pushing on opposite ends of them.

By reference to Fig. 25 of the drawings, it will be seen that these three valves having spools 369, 370 and 371 of the two valve assemblies 313 and 314 are connected in parallel in pairs so that the operation of either spool 369 of the valve 313 or the valve 314 will control the front left hand jack 58 either to expand it or to contract it. Similarly controlling either spool 370 of valve 313 or 314 will control right hand front jack 58. Likewise, controlling the spool 371 of either valve 313 or 314 will control the two rear jacks 57.

Referring again to Fig. 13, it will be seen that the spool 370 is provided with spaced lands 385 and 386 which co-operate with the chambers 378 and 379 to control the expansion, contraction or locking of the controlled jacks in position.

When the parts are in their normal positions, as illustrated in Fig. 13, land 386 locks the control jack 58 in any position to which it is adjusted. If the spool 370 is moved upwardly, as viewed in Fig. 13, hydraulic fluid under pressure in chamber 378 will be communicated to chamber 379 to expand the associated jack. If the spool 370 is moved downwardly, as viewed in said figure, the motor or jack chamber 379 will communicate with the drain chamber 380 and thus permit the associated jack to contract under the weight of the mining machine.

Not only does the operator have control of one torque converter, a feed rope drum and a two-speed planetary gear by operation of a single shaft 338 and handle 341 which controls a multiple control valve 313 which is individual thereto, but dual controls are provided for each of the multiple control valves 313 and 314 whereby both of said valves may be controlled from either side of the machine and thus an operator on either side may control both fluid couplings, drums and transmissions.

In Fig. 19 of the drawings the structure which provides for the dual control of each valve 313 and 314 is disclosed. Some of the mechanism, including particularly that designated valve 313, is also seen in Figs. 13 and 14 of the drawings.

As previously mentioned, the shaft 338 is mounted on the casing or block 315 and thus is removable as a unit with the unitary combination valve 313. Keyed rigidly to said shaft 338 is a gear 387.

It may well be pointed out here that, seen by referring to Figs. 15 and 22 of the drawings, there is a lug or detent 388 formed on the casing or block 315 adjacent the gear 387 which is adapted to fit into a groove 389 (see Fig. 22) in the periphery of said gear 387 formed by removing one of the teeth. This detent and groove are so positioned that they are in alignment, as illustrated in Fig. 22, only when the handle 341 is rotated to its zero pressure position, or, in other words, rotated so that the parts are in the positions illustrated in Fig. 13 of the drawings.

Under these conditions, the shaft 338 and handle 341 can be reciprocated or moved rectilinearly since the detent 388 will clear the gear 387 by virtue of the groove 389. This requires the fluid coupling pressure relief valve to be returned to zero before it is possible to change the transmission speed. Whenever the knob or handle 341 is moved either to its full-out or full-in position, the gear will clear the detent or lug 388, for example, as illustrated in Fig. 15 of the drawings where the knob is in its full-out position which is the fast or high speed position.

Before describing in detail the complete gearing which provides for the pull control of each valve 313 and 314, it may be mentioned that this gearing is such that either operating handle will have a similar effect on its controlling valve when rotated in the same direction or when reciprocated in the same direction. That is, handle 341 when pulled out will effect a high speed drive of drum 48. Its associated handle will do the same thing. When either of said handles is pushed in, they will effect a low speed drive of the drum 48. Likewise, rotating either of said handles in a clockwise direction will increase the rope pull on rope 50 or, in other words, increase the torque of the fluid coupling. The same applies for the other controls of the combination valve 314.

Mounted on an arm 390 (see Figs. 13 and 19), which is an integral part of the block 315, is a pair of wide faced meshing reach gears 391 which mesh with the gear 387 for all of its positions of adjustment produced by shifting the shaft 338, as above mentioned. The reach gears 391 reach to and drive a gear 392 rigidly attached to the end of a tubular drive shaft 393 which is mounted on spaced anti-friction bearings 394 carried in spaced partitions 213 of the two spaced oil reservoirs 212 on opposite sides of the machine.

At its right hand end, as viewed in Fig. 19, the tubular shaft 393 carries a rigidly attached shrouded gear 395 which meshes with and drives a gear 396 fixed to a longitudinally slidable shaft 397 provided with a second rigidly attached gear 398 meshing with and driving a second shrouded gear 399 which is rigidly attached to a hollow shaft 400 extending through the oil seals in a side wall of the casing 42 and provided with an operating handle or knob 401. If the knob 341 is rotated in a clockwise direction, as viewed by an operator facing it, it will drive the knob 401 in a clockwise direction, as viewed by an operator facing it, through the gears 387, 391, 392, shaft 393, gears 395, 396 and shaft 397, and gears 398 and 399.

Provision is also made so that reciprocatory or rectilinear outward and inward movement of the handle 341 and shaft 338 will produce similar outward and inward movement of the knob or handle 401 and shaft 400. To this end, also extending through the hole or opening 340, as does the arm 390, there is a pivot arm 402 removably attached to the block 315 (see Fig. 15), upon which a bifurcated double ended pivoted shipper 403 is mounted for pivotal movement about an upright pivot pin 404. The double ended shipper 403 co-operates with grooved collars formed integral with the gears 387 and 393 so that when gear 387 is moved inwardly, gear 392 and with it shaft 393 will move outwardly, and vice versa.

It may be mentioned here that when the combination valve 313 is removed as a unit, the shipper 403 and gears 391 will be removed with it and the co-operating bifurcated arms of the shipper 403 are engageable with and disengageable from the collar of gear 392 by the simple expedient of slipping them on and off said collar.

Rectilinear, longitudinal or reciprocatory motions thus transmitted to the hollow shaft 393 will be further transmitted by the shrouded gear 395 to reciprocate shaft 397 and its two gears 396 and 398, the latter of which will in turn transmit this motion to the shrouded gear 399 and its attached hollow shaft 400 and handle 401. The shipper 403 will, of course, reverse the movement of the shaft 338, as compared with the shaft 393 and thus when handle 341 is moved inwardly, handle 401 will be moved inwardly, or conversely, if handle 401 is moved inwardly it will have the same effect on the spool 348 as will the inward movement of shaft 338, and vice versa.

Control mechanism is also provided whereby similar and dual control of the fluid coupling valve and the transmission valve of the combination valve assembly 314 may be effected by a pair of control knobs or handles 405 and 406 on opposite sides of the mining machine. It is to be understood that operation of either of the knobs or handles 405 or 406 will produce the same operation in the valve 314 as is produced by a similar operation of either the knobs 341 or 401 in the valve 313.

Knob or handle 405 is rigidly connected to a shaft 407 extending through oil seals in the outer wall of the frame 42, which shaft 407 also extends through the hollow operating shaft 393. At its right hand end, as viewed in Fig. 19, shaft 407 extends loosely into a bore in the shaft 400 and is free to reciprocate therein. Rigidly attached to the shaft 407 between the two shrouded gears 395 and 399 is a gear 408 which meshes with a pair of reach gears 409 mounted on an arm 410 similar to the arm 390. The reach gears 409 drive a gear, not shown, but similar to the gear 387 of valve 313 and which is mounted on a shaft 411 of said valve 314 which is a duplicate in structure and function of the previously described shaft 338 of valve 314.

A pivoted shipper 412 mounted on an arm 413 similar to arm 402, co-operates with the grooved collar on the mentioned gear which is carried on shaft 411 similar to the manner in which shipper 403 cooperates with the grooved collar on gear 387. The outer end of the shipper 412 likewise cooperates with the grooved collar on the gear 408 so that rectilinear or reciprocating motion of the shaft 411 or handle 406 is transmitted to the shaft 407 and the handle 405, or vice versa. Here also, outward or inward movement of either handle 405 or 406 will produce similar motion of the other and clockwise or counterclockwise motion of either handle 405 or 406 will produce similar movement of the other.

Attention is now directed to Fig. 25 of the drawings and to certain features of the hydraulic system which have not heretofore been particularly described. The low pressure high volume sump pump 222 is effective to keep the oil in the central cell of machinery compartment 42 at a low level since it is of high capacity. This oil is then delivered over the parallel paths to the two oil reservoirs 212 at the sides of the machinery compartment by way of output conduit 414.

The output of conduit 355 of the high pressure pump 221 flows first through a high pressure relief valve 415 and whenever the fluid output of the pump 221 exceeds the fluid demand, which will be the situation during an appreciable portion of the normal operation of the machine, the relief valve 415 will open and its output delivered to various places to lubricate gears, bearings and the like. For example, one branch leading from the relief valve 415 leads to a fitting 153 (Fig. 3) and delivers the oil to a bore in the drive shaft 59 for lubricating the motor bearings. In addition, branches also lead to lubricate the bearings 66 and the gear 65 in the central machinery containing section of the machinery compartment 42.

It is thus to be noted that a pressure rather than a splash lubricating system is provided for various gears, bearings, etc., of the machine, and this is particularly desirable since it avoids the tendency which is present in splash systems for oil to leak into the motor casing or housing and damage the electrical parts of the electric driving motor. In other words, the portion of the machinery compartment 42, which communicates through any opening with the motor compartment, is not filled or even partially filled with oil, but the parts therein are lubricated by a forced feed lubricating system. The two fluid couplings 234 are mounted in the individual reservoirs 212 on opposite sides of the machine and these reservoirs will be kept full of oil at all times by the sump pump 222.

Each fluid coupling 234 is, of course, controlled by its own individual variable pressure relief valve and the amount of slippage, and consequently the amount of torque developed on each drum, is dependent upon the relative rotation between the rotor 235 and the casing 241, 242 of the fluid coupling which in turn is dependent upon the fluid flow therefrom, as controlled by its pressure relief valve. For example, if the fluid flow from the fluid coupling is zero, there will be no slip whatever between the driving and driven elements thereof, and it will be in effect a direct coupling. The maximum fluid flow will develop for any given rotor speed when the casing 241, 242 is stationary, or, in other words, when the torque is zero, and consequently there is no rotation whatever of the associated drum 48 or 49.

It is thus evident that by the simple expedient of controlling the pressure at which the hydraulic fluid is discharged from the fluid coupling, the torque output thereof, or, in other words, the pull on the rope 50 or 51 of the associated drum 48 or 49, may be determined at any one of a plurality of values having an infinite number of steps.

From the above description, it is evident that the disclosed machine is of low overall height and thus meets requirements of thin seam mining. Furthermore, the machine is one which meets the requirements of conveyor mining, particularly wherein a face conveyor is employed directly behind the mining machine. The controls for the machine are located on the sides and are substantially duplicated on each side. The location of the controls at the sides is also desirable, particularly where the gummer or cuttings remover is attached and this device may either be attached or detached, or in other words, the machine may be built with or without it and if built with it, it may be subsequently removed.

The feed rope drums on opposite sides are both power driven, each having a two-speed control and each provided with an individually controllable hydraulic coupling in which the torque may be adjusted continuously from zero to maximum value. The high speed, of course, is primarily for handling, the low speed for feeding or cutting.

When the machine is sumped forwardly into the coal by making a sumping cut, both feed drums will be operated at their low or feeding speed and both ropes will be wound in, in this feeding operation.

Furthermore, reversing of the direction of rotation of the driving motor for the cutter chain does not reverse the drums, as they are always driven in the same direction from said motor by virtue of the automatic clutches previously described. When the mining machine is employed to cut a kerf by moving it across the room face, it is, of course, obvious that one of the ropes is a feed rope and is being pulled in by the feed drum which is being driven at a low speed, while the other rope is a tail rope and is being payed out under tension. This is effected in a very efficient manner by the operation of the two independent fluid couplings. The fluid coupling which controls the power or feed drum will be operated to deliver considerable torque. For example, assuming the machine being fed, as illustrated in Fig. 1 of the drawings; the cable 51 is the power cable and its drum 49 will be winding it in and feeding the machine to the left, as viewed from the rear, all the while it is cutting a kerf.

This will mean that there will be a predetermined relatively high pull on the rope 51 which may be set at any value up to 40,000 pounds. As a consequence, the fluid coupling controlled by the high pressure adjustable valve of the valve assembly 314 will be operating at a relatively high pressure and low volume. In other words, it will have a small amount of slip and its hydraulic output will be discharged at a relatively high pressure.

The pull on the rope 51 will be substantially constant, as determined by the setting of the control valve which may be controlled either by handle 341 or handle 401. The rope 50, however, will be paying out and consequently the drum 48 will be operating in the reverse direction to which it tends to be driven by the motor within the motor section 41. This reverse travel of the drum 48 will, of course, produce a high relative speed between the casing and the rotor of the fluid coupling associated with drum 48. The transmission mechanism associated therewith will be in high speed so that the reverse gear ratio will be a minimum.

The control valve for the fluid coupling associated with the drum 48 will be set for a very low discharge pressure and such as will permit this essentially reverse travel of the drum 48 which will cause a high fluid output of the said associated fluid coupling. Thus the fluid coupling can be controlled so that the power on its output shaft is actually greater than the power on its input shaft, with a consequent high volume of fluid delivery. In this manner the pull on the rope 50 may be adjusted at any desired value necessary to keep the cutter bar 45 in proper position as the machine is fed across the face.

It is further obvious that a reverse action will take place when the mining machine is fed in reverse direction, in which case the rope 50 will, of course, be reeved forwardly about the front sheave 187, while the rope 51 will extend rearwardly and laterally from the sheave assembly 53.

As was previously mentioned, it is to be distinctly understood that the drive gearing involving the variable fluid coupling, are applicable to all other known types of mining machines.

It may further be mentioned again that once the machine is placed in operation the speed of cutting will automatically increase or decrease as required by the hardness of the cutting, to maintain a substantially constant pull on the feed rope.

The hydraulic jacks 57 and 58 are optional and, if omitted, their control valves are also preferably omitted. When provided, they may be employed to elevate the mining machine and the cutter bar 45 or to tilt it along longitudinal and/or transverse axes. This is provided by virtue of the independent adjustment of each of the front jacks 58 and the parallel or simultaneous adjustment of the two rear jacks 57 which, due to their parallel relation, provide what is in effect a three-point suspension for the mining machine when elevated by operating the four jacks.

The specific construction of the feed drums is disclosed and claimed in my divisional application, Serial No. 52,233, filed October 1, 1948, now Patent No. 2,543,634, dated February 27, 1951, and the specific structure of the valve assembly, per se, is disclosed and claimed in my divisional application, Serial No. 52,234, filed October 1, 1948, now Patent No. 2,547,646, dated April 3, 1951.

Other features and characteristics of the mining machine are believed adequately described and explained above.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a mining machine, feed means therefor including a hydraulic coupling and a feed drum, a hydraulically operated clutch for engaging and disengaging said feed drum, a variable relief valve for controlling said hydraulic coupling, a control valve for said drum clutch, and interlocking means between said control valve and said variable relief valve constructed and arranged whereby said feed drum clutch is released whenever said relief valve is moved from its minimum pressure position.

2. In a mining machine, feed means therefor including a hydraulic coupling and a feed drum, a hydraulically operated clutch for engaging and disengaging said feed drum, a variable relief valve for controlling said hydraulic coupling, a control valve for said drum clutch, and interlocking means between said control valve and said variable relief valve.

3. A mining machine including a motor, a pair of separate feed mechanisms, a gear train branch from said motor to each feed mechanism including a two-speed transmission and a hydraulic coupling both individual to each feed mechanism, the hydraulic coupling and transmission of each feed mechanism having a variable pressure relief control valve and a speed control valve, respectively, an operating shaft common to the relief control valve and the speed control valve of each feed mechanism and operable by rotation to control the former and by reciprocation to control the latter, and a pair of handle controlled mechanisms for rotating and reciprocating each of said operating shafts, there being a pair of said operating handles on opposite sides of said machine, each pair including handles for operating all of the relief control and speed control valves.

4. In a mining machine, the combination with a reversible motor, of a feeding device, of a drive shaft adapted to be reversibly driven, gearing interconnecting said motor and drive shaft including a large bevel gear concentric with said shaft and mounted for rotation with respect thereto, gearing permanently connecting said large bevel gear to be driven by said motor, clutch means for selectively connecting and disconnecting said large bevel gear and said shaft, a pair of bevel gears meshing with said large bevel gear and driven thereby in opposite directions, and a pair of one way clutch mechanisms selectively interconnecting said oppositely driven bevel gears automatically with said feeding device whereby said feeding device will always be driven in the same direction for reverse operation of said motor and large bevel gear.

5. In a mining machine, the combination with a reversible motor, of a feeding device and gearing interconnecting said reversible motor and feeding device including a large bevel gear, gearing permanently connecting said large bevel gear to be driven in reverse directions by said reversible motor, a pair of bevel gears meshing with said large bevel gear and driven thereby in opposite directions, and a pair of one-way clutch mechanisms selectively interconnnecting said oppositely driven bevel gears automatically with said feeding device whereby said feeding device will always be driven in the same direction for reverse operation of said motor and large bevel gear.

6. In a mining machine, the combination with a reversible motor, of a feeding device, of a drive shaft adapted to be reversibly driven, gearing interconnecting said motor and drive shaft including a large bevel gear concentric with said shaft and mounted for rotation with respect thereto, gearing permanently connecting said large bevel gear to be driven by said motor, clutch means for selectively connecting and disconnecting said large bevel gear and said shaft, a pair of bevel gears meshing with said large bevel gear and driven thereby in opposite directions, a pair of one-way clutch mechanisms selectively interconnecting said oppositely driven bevel gears automatically with said feeding device whereby said feeding device will always be driven in the same direction for reverse operation of said motor and large bevel gear, and a third bevel gear meshing with said large bevel gear adapted to drive mechanism different from that driven by said drive shaft.

7. In a mining machine, the combination with a reversible motor, of a feeding device and gearing interconnecting said reversible motor and feeding device including a large bevel gear, gearing permanently connecting said large bevel gear to be driven in reverse directions by said reversible motor, a pair of bevel gears meshing with said large bevel gear and driven thereby in opposite directions, a pair of one-way clutch mechanisms selectively interconnecting said oppositely driven bevel gears automatically with said feeding device whereby said feeding device will always be driven in the same direction for reverse operation of said motor and large bevel gear, and a third bevel gear meshing with said large bevel gear adapted to drive reversibly other mechanism of the mining machine.

8. In a mining machine, the combination with a reversible motor, of a feeding device, a drive shaft adapted to be reversibly driven, gearing interconnecting said motor and drive shaft including a large bevel gear concentric with said shaft, gearing permanently connecting said large bevel gear to be driven by said motor, a pair of bevel gears meshing with said large bevel gear and driven thereby in opposite directions, a pair of one-way clutch mechanisms selectively interconnecting said oppositely driven bevel gears automatically with said feeding device whereby said feeding device will always be driven in the same direction for reverse operation of said motor and large bevel gear, and a third bevel gear meshing with said large bevel gear adapted to drive reversibly other mechanism of the mining machine.

ARTHUR L. LEE.

References Cited in the file of this patent

UNITED STATES PATENTS

| Number | Name | Date |
|---|---|---|
| 1,173,170 | Cartlidge | Feb. 29, 1916 |
| 1,519,957 | Corneil | Dec. 16, 1924 |
| 1,639,255 | Brackett | Aug. 16, 1927 |
| 1,662,794 | Holmes | Mar. 13, 1928 |
| 1,685,839 | Du Bois | Oct. 2, 1928 |
| 1,715,469 | Newdick | June 4, 1929 |
| 1,725,141 | Holmes | Aug. 20, 1929 |
| 1,875,340 | Holmes | Sept. 6, 1932 |
| 1,875,351 | Osgood | Sept. 6, 1932 |
| 1,891,561 | Levin | Dec. 20, 1932 |
| 2,128,064 | Wood | Aug. 23, 1938 |
| 2,136,921 | Joy | Nov. 15, 1938 |
| 2,172,975 | Huthsing | Sept. 12, 1939 |
| 2,225,666 | Simmons | Dec. 24, 1940 |
| 2,283,376 | Lindgren | May 19, 1942 |
| 2,315,430 | Joy | Mar. 30, 1943 |
| 2,336,992 | Lindgren | Dec. 14, 1943 |
| 2,339,407 | Horton | Jan. 18, 1944 |
| 2,375,045 | Sloane | May 1, 1945 |
| 2,420,305 | Donahew et al. | May 13, 1947 |
| 2,452,760 | Jeffrey | Nov. 2, 1948 |

FOREIGN PATENTS

| Number | Country | Date |
|---|---|---|
| 611,897 | Germany | Apr. 8, 1935 |

OTHER REFERENCES

Mining Congress Journal—December 1941, pages 30 through 34; article, "Fluid Drive for Mining Machinery," by John D. Rosebrough.